US012349216B2

(12) United States Patent
Chitrakar et al.

(10) Patent No.: US 12,349,216 B2
(45) Date of Patent: Jul. 1, 2025

(54) COMMUNICATION APPARATUS AND COMMUNICATION METHOD FOR ENHANCED DIRECT LINK COMMUNICATION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 480 days.

(21) Appl. No.: 17/618,847

(22) PCT Filed: Apr. 23, 2020

(86) PCT No.: PCT/SG2020/050249
§ 371 (c)(1),
(2) Date: Dec. 13, 2021

(87) PCT Pub. No.: WO2021/002802
PCT Pub. Date: Jan. 7, 2021

(65) Prior Publication Data
US 2022/0312513 A1    Sep. 29, 2022

(30) Foreign Application Priority Data

Jul. 4, 2019 (SG) .......................... 10201906255Q

(51) Int. Cl.
*H04W 76/30* (2018.01)
*H04W 28/02* (2009.01)
(Continued)

(52) U.S. Cl.
CPC ....... *H04W 76/14* (2018.02); *H04W 28/0278* (2013.01); *H04W 76/12* (2018.02); *H04W 76/30* (2018.02)

(58) Field of Classification Search
None
See application file for complete search history.

(56) References Cited

U.S. PATENT DOCUMENTS

| 8,743,711 B2 | 6/2014 | Trainin |
| 2011/0059762 A1 | 3/2011 | Jones, IV et al. |

(Continued)

FOREIGN PATENT DOCUMENTS

| JP | 2014195303 A | 10/2014 |
| JP | 2018512021 A | 4/2018 |
| JP | 2019041136 A | 3/2019 |

OTHER PUBLICATIONS

International Search Report, mailed Sep. 28, 2020, for International Application No. PCT/SG2020/05249, 7 pages.
(Continued)

*Primary Examiner* — Kouroush Mohebbi
(74) *Attorney, Agent, or Firm* — Seed IP Law Group LLP

(57) ABSTRACT

The present disclosure provides communication apparatus and communication method for enhanced direct link communication. A communication apparatus is configured to communicate wirelessly with an access point (AP) on a first channel, the communication apparatus comprising: circuitry, which, in operation, generates a channel use permission request frame, the channel use permission request frame comprising information indicating the communication apparatus, another communication apparatus and a second channel that is different from the first channel; a transmitter, which, in operation, transmits the generated channel use permission request frame to the AP to seek permission from the AP to use the second channel for direct link communi-
(Continued)

cation with the another communication apparatus; and a receiver, which, in operation, receives a channel use permission response frame from the AP permitting use of the second channel, wherein the communication apparatus is further configured to communicate with the another communication apparatus on a direct link in the second channel after receiving the channel use permission response frame.

6 Claims, 24 Drawing Sheets

(51) Int. Cl.
*H04W 76/12* (2018.01)
*H04W 76/14* (2018.01)

(56) References Cited

U.S. PATENT DOCUMENTS

| | | |
|---|---|---|
| 2011/0141968 A1 | 6/2011 | Trainin |
| 2012/0120892 A1* | 5/2012 | Freda .................... H04W 8/005 370/329 |
| 2013/0064152 A1* | 3/2013 | Seok ................. H04W 52/0216 370/311 |
| 2013/0121293 A1 | 5/2013 | Surineni et al. |
| 2013/0329693 A1 | 12/2013 | Lee et al. |
| 2014/0211703 A1 | 7/2014 | Seok |
| 2014/0328262 A1 | 11/2014 | Sampath et al. |
| 2015/0036640 A1* | 2/2015 | Seok ..................... H04W 76/14 370/329 |
| 2016/0234834 A1 | 8/2016 | Aboul-Magd et al. |
| 2018/0020372 A1 | 1/2018 | Viger et al. |
| 2019/0029041 A1 | 1/2019 | Tomeba et al. |

OTHER PUBLICATIONS

Extended European Search Report, dated Jul. 22, 2022, for European Application No. 20835174.2-1215/3994951, 16 pages.

* cited by examiner

COMMUNICATION APPARATUS AND COMMUNICATION METHOD FOR ENHANCED DIRECT LINK COMMUNICATION

TECHNICAL FIELD

The present disclosure relates to communication apparatuses and methods for enhanced direct link communication, and more particularly to communication apparatuses and methods for enhanced direct link communication in regulated bands such as the 6 GHz band.

BACKGROUND

The USA FCC (Federal Communications Commission) has recently opened up the 6 GHz band for unlicensed use. The 6 GHz band will play an important role in achieving the throughput goals of upcoming wireless standards such as IEEE 802.11ax (HE), IEEE 802.11be (EHT), 3GPP 5G standards etc.

In order to protect the incumbent users, in the latest Notice for Proposed Rulemaking (NPRM), FCC has proposed following rules:

U-NII-5 and U-NII-7 sub-bands are heavily used by point-to-point microwave links, including links that must maintain a high level of availability. Thus, these sub-bands permit only "standard-power access points (AP)" using power levels of U-NII-1 and U-NII-3 bands to operate on frequencies determined by an AFC (Automated Frequency Coordination) system. U-NII stands for Unlicensed National Information Infrastructure.

U-NII-6 and U-NII-8 sub-bands are used by mobile stations where the location of the incumbent receivers is not easily determined from existing databases, making use of AFC difficult. Thus, these sub-bands may only permit indoor "low-power access point" using lower power levels of U-NII-2 bands.

Client devices may be permitted to operate across the entire 6 GHz band while under the control of either a standard-power AP or a low-power AP However, there has been no discussion on communication apparatuses and methods for direct link communication in the 6 GHz band. Particularly in the U-NII-5 and U-NII-7 sub-bands, it is not clear how the devices involved in direct link communication may operate since the devices may not have direct connection with an AFC system.

There is thus a need for communication apparatuses and methods that provide feasible technical solutions for enhanced direct link communication in the 6 GHz band. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for enhanced direct link communication.

According to a first embodiment of the present disclosure, there is provided a communication apparatus configured to communicate wirelessly with an access point (AP) on a first channel, the communication apparatus comprising: circuitry, which, in operation, generates a channel use permission request frame, the channel use permission request frame comprising information indicating the communication apparatus, another communication apparatus and a second channel that is different from the first channel; a transmitter, which, in operation, transmits the generated channel use permission request frame to the AP to seek permission from the AP to use the second channel for direct link communication with the another communication apparatus; and a receiver, which, in operation, receives a channel use permission response frame from the AP permitting use of the second channel, wherein the communication apparatus is further configured to communicate with the another communication apparatus on a direct link in the second channel after receiving the channel use permission response frame.

According to a second embodiment of the present disclosure, there is provided a communication apparatus configured to communicate wirelessly with an access point (AP), the communication apparatus comprising: circuitry, which, in operation, generates a Tunnel Direct-Link Setup (TDLS) Request To Send (RTS) frame, the TDLS RTS frame comprising information indicating another communication apparatus; a transmitter, which, in operation, transmits the generated TDLS RTS frame to the AP to request a transmission opportunity (TXOP) for TDLS transmission with the another communication apparatus; and a receiver, which, in operation, receives a TDLS Clear To Send (CTS) frame from the AP, wherein the transmitter is further configured to transmit, within the requested TXOP, one or more data frames on a TDLS direct link to the another communication apparatus after receiving the TDLS CTS frame.

According to a third embodiment of the present disclosure, there is provided an access point (AP) configured to communicate wirelessly with a communication apparatus on a first channel; the AP comprising: a receiver, which, in operation, receives a channel use permission request frame from the communication apparatus, the channel use permission request frame requesting use of a second channel that is different from the first channel for direct link communication with another communication apparatus, circuitry, which, in operation, determines from a frequency coordination database whether the second channel may be used by the communication apparatus and the another communication apparatus after receiving the channel use permission request frame, the circuitry further configured to generate a channel use permission response frame, the channel use permission response frame comprising information indicative of the determination; and a transmitter, which, in operation, transmits the channel use permission response frame to the communication apparatus, the channel use permission request frame comprising information indicative of the determination, wherein the communication apparatus is configured to communicate on the direct link in the second channel with the another communication apparatus based on the determination.

According to a fourth embodiment of the present disclosure, there is provided an access point (AP) configured to communicate wirelessly with a communication apparatus; the AP comprising: a receiver, which, in operation, receives a Tunnel Direct-Link Setup (TDLS) Request To Send (RTS) frame from the communication apparatus, the TDLS RTS frame requesting the AP for a transmission opportunity (TXOP) for TDLS transmission with another communication apparatus, the TDLS RTS frame comprising information indicating the another communication apparatus; circuitry, which, in operation, generates a TDLS Clear To Send (CTS) frame; and a transmitter, which, in operation, transmits the TDLS CTS frame to the communication apparatus, wherein the communication apparatus is configured to transmit, within the requested TXOP, one or more data frames on a TDLS direct link to the another communication apparatus after receiving the TDLS CTS frame.

According to a fifth embodiment of the present disclosure, there is provided a communication method comprising: generating a channel use permission request frame, the channel use permission request frame comprising information indicating a communication apparatus, another communication apparatus and a second channel that is different from a first channel; transmitting the generated channel use permission request frame to an AP to seek permission from the AP to use the second channel for direct link communication with the another communication apparatus; receiving a channel use permission response frame from the AP permitting use of the second channel, and communicating on the direct link in the second channel with the another communication apparatus on the second channel after receiving the channel use permission response frame.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

Figure 1A:
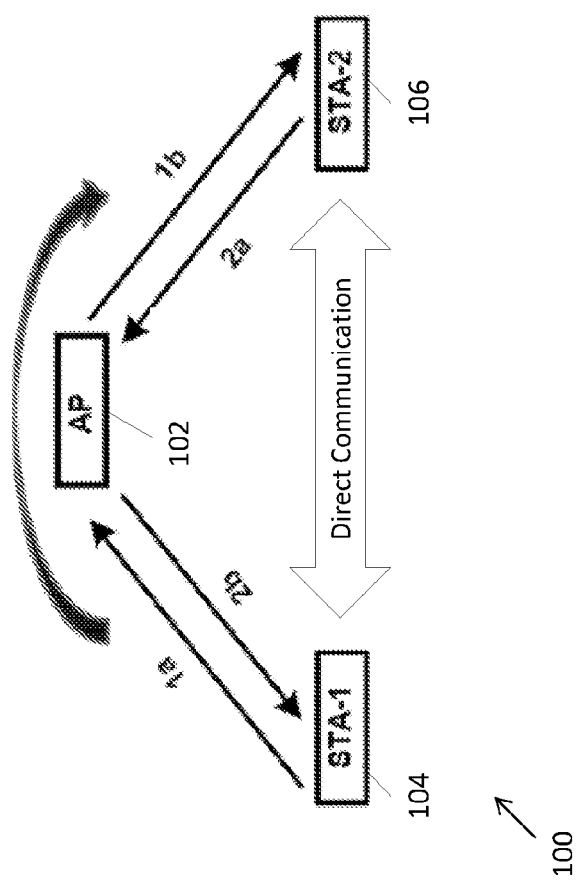
FIG. 1A depicts a schematic diagram for setting up a direct link communication between two stations (STAs).

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for enhanced direct link communication.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

Direct Link communications (also known as peer to peer or device to device communication) provides many benefits. In traditional wireless networks such as IEEE 80 2.1 1 WLANs, all communications need to go through the access point (AP), even when the two devices involved in the communication are part of the same wireless network (known as Basic Service Set (BSS) in 802.11). In order to make such device to device communication more efficient Tunneled Direct Link Setup (TDLS) was introduced in the IEEE 802.11z amendment. TDLS is characterized by the use of set-up frames that are encapsulated in data frames that can be transmitted through the AP transparently, hence the term "tunneling'. All management frames involved in the setup of TDLS such as, for example, a TDLS setup request frame and a TDLS setup response frame, are encapsulated within data frames, so the setup of TDLS is completely transparent to the AP. In fact, the AP may not even need to be TDLS capable. The communication link between two devices using TDLS is known as TDLS direct link or simply TDLS link. Since packets between the two devices are exchanged directly over the TDLS link, and do not go through the AP, TDLS can reduce by half the number of packet transmissions. Hence TDLS links increase the efficiency of the wireless network, especially when the two devices are relatively closer to each other than to the AP. The TDLS link may even be able to make use of higher data rates due to the reduced distance between the device as compared to the wireless link with the AP.

FIG. 1A depicts a schematic diagram 100 for setting up a direct peer to peer communication between two non-AP STAs. The STA 104 may transmit a TDLS setup request frame via the AP 102 to the STA 106 (as shown in transmission paths 1a and 1b) for setting up a direct link communication between the STA 104 and the STA 106. The STA 106 may then transmit a TDLS setup response frame via the AP 102 to the STA 104 (as shown in transmission paths 2a and 2b) in response to receiving the TDLS request frame. The TDLS setup request frame and the TDLS setup response frame are management frames for setting up the TDLS and are transmitted directly to/from the AP with data encapsulation, so that the TDLS setup is transparent to the AP 102. Once the TDLS is setup, the two STAs 104 and 106 can communicate directly with each other via a "direct link". The direct link may also be switched to a channel different from the operating channel of the BSS (base channel) and may even be on a different band; such a direct link channel is called an "off-channel".

Currently, APs do not have any control over TDLS setup/usage. However, in the 6 GHz band, client devices are permitted to operate in the 6 GHz band only while under the control of an AP. When operating in the 5 GHz DFS (Dynamic Frequency Selection) band, a TDLS initiator STA acts as the DFS Owner (DO); in the 6 GHz band, however, TDLS STAs may not have such capability.

Therefore, the present invention proposes enhanced direct link communication procedure that allows the AP more control over the direct link communication in specific bands/channels. Without such enhancements, direct links such as TDLS may be disallowed in the 6 GHz band.

When operating in some sub-bands of the 6 GHz band (e.g. U-NII-5 and U-NII-7), the AP may be required to consult an AFC Database (Automatic Frequency Control Database) to determine permissible operating frequency and transmission parameters. Such APs may be known as AFC Database Dependent (ADD) enabling STAs while non-AP STAs associated with such APs may be known as ADD dependent STAs. Non-AP STAs may only communicate on channels on these sub-bands when "enabled" by the enabling STAs and such non-AP STAs may be said to be "under the control" of the AP. An AP may indicate its presence on a channel that requires enablement by periodically transmitting enabling signals on the channel, for example by including such enabling signals in the Beacon frames.

When two ADD dependent STAs negotiate a TDLS direct link on a base channel, they can use the same transmission parameters used for the AP link for transmissions on the TDLS direct link.

Figure 1B:
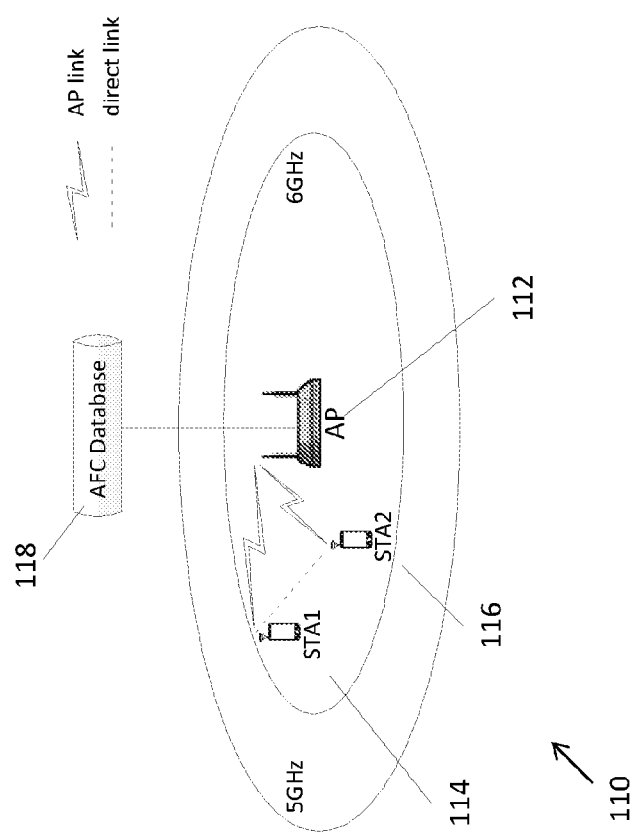
FIG. 1B depicts a schematic diagram of a direct link communication between two stations (STAs) in an infrastructure network.

FIG. 1B depicts a schematic diagram 110 of a TDLS direct link communication between two stations (STAs) in a channel infrastructure network. Another benefit of TDLS is that since TDLS is transparent to the AP, if both devices support more advanced capabilities than the AP, then the TDLS link can operate at the higher capabilities than may not be supported by the AP. For example, the AP 112 may only support 802.11ac but the two TDLS devices may both support the latest 802.11ax amendment, then the devices can communicate at the higher 802.11ax data rates over the direct link. In addition, if the two devices are multi-band devices and they are connected to the AP in the 5 GHz band (base channel) but if both devices support the 6 GHz band the two devices may also choose to switch the TDLS link to a wider channel in the 6 GHz band (off-channel TDLS link), even though the AP itself does not operate in the 6 GHz band.

As mentioned above, the AP 112 may consult the AFC database 118 to determine permissible operating frequency and transmission parameters. ADD dependent STAs 114 and 116 may then use the same transmission parameters used for the AP link for transmissions on a TDLS link between STAs 114 and 116 if the TDLS link is within the operating channel of the BSS, i.e. the direct link is on a base channel. Although in FIG. 1B, a direct link is depicted between the AP and the AFC database, in reality, the AP may go through an AFC system to check the availability of a channel in the AFC database. Alternatively, there may not be direct interactive between the AP and the AFC database and all decisions regarding the availability of a channel (frequency usage) in a particular geo-location may be made by the AFC system.

However, when two non-AP STAs intends to setup or switch the TDLS direct link to a channel in the 6 GHz band that is not the base channel, the following rules shall apply:
The associated AP shall be an ADD enabling STA.
The TDLS initiator STA shall seek permission from the AP to use a channel for direct link by transmitting a TDLS Channel Use Permission Request frame to the AP.
AP responds by transmitting the TDLS Channel Use Permission Response frame.
The direct link may be setup/switched in a channel in the 6 GHz band that is not a base channel only after receiving a TDLS Channel Use Permission Response frame from the AP with the Status of SUCCESS.

Figure 1C:
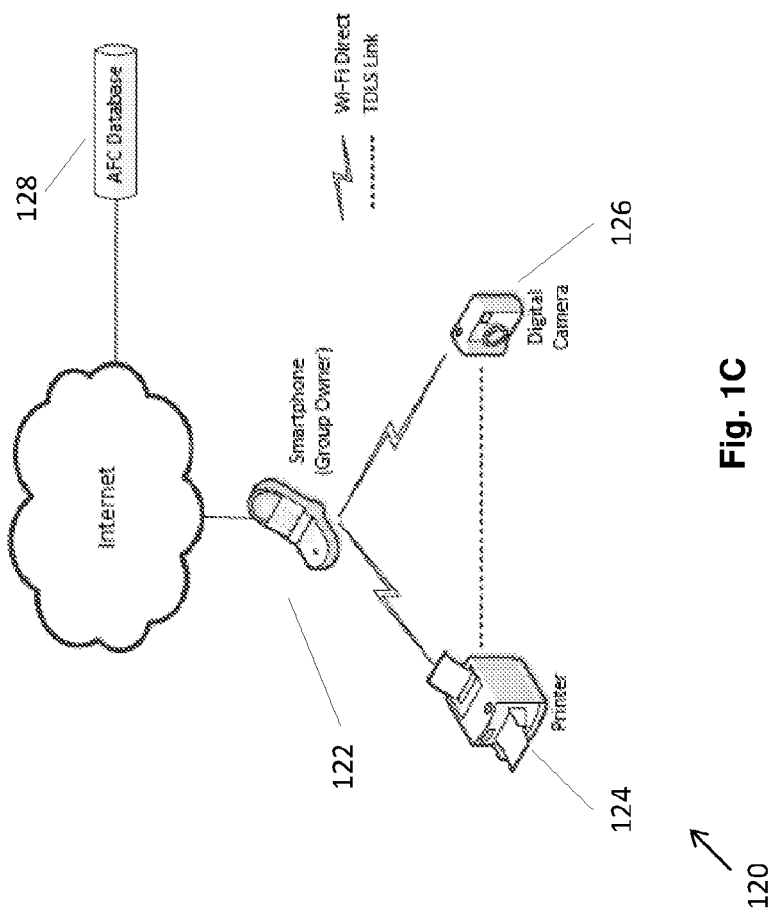
FIG. 1C depicts a schematic diagram of a direct link communication between two stations (STAs) in a Wi-Fi Direct (peer-to-peer) network.

FIG. 1C depicts a schematic diagram 120 of a direct link communication between two stations (STAs) in a Wi-Fi Direct (peer-to-peer) network. TDLS links can also operate within temporary wireless networks such as the Wi-Fi Alliance Wi-Fi Direct network. Wi-Fi Direct networks are device-to-device networks in which a single device acts as a "Group Owner" (GO) and no traditional AP is required. For example, in FIG. 1C, a Smartphone 122 may act as the GO while a Wi-Fi enabled Printer 124 and a Wi-Fi enabled digital camera 126 may join a Wi-Fi Direct network by forming Wi-Fi Direct connection with the GO. In this case, the GO acts as the AP and TDLS links may be established between the digital camera 126 and the printer 124 such that the digital camera 126 can transmit photos directly to the printer 124 for printing. Again, if both the digital camera 126 and the printer 124 are multi-band devices and both support the 6 GHz band the two devices may also choose to switch the TDLS link to a wider channel in the 6 GHz band (off-channel TDLS link). In this example, as long as the smartphone 122 has access to the internet and is able to access an AFC database 128 (via an AFC system), it may also act as an ADD enabling STA and also provide permission for the two TDLS devices to transmit on the TDLS direct link in a channel in the U-NII-5 and U-NII-7 sub-bands of the 6 GHz band.

Figure 2:
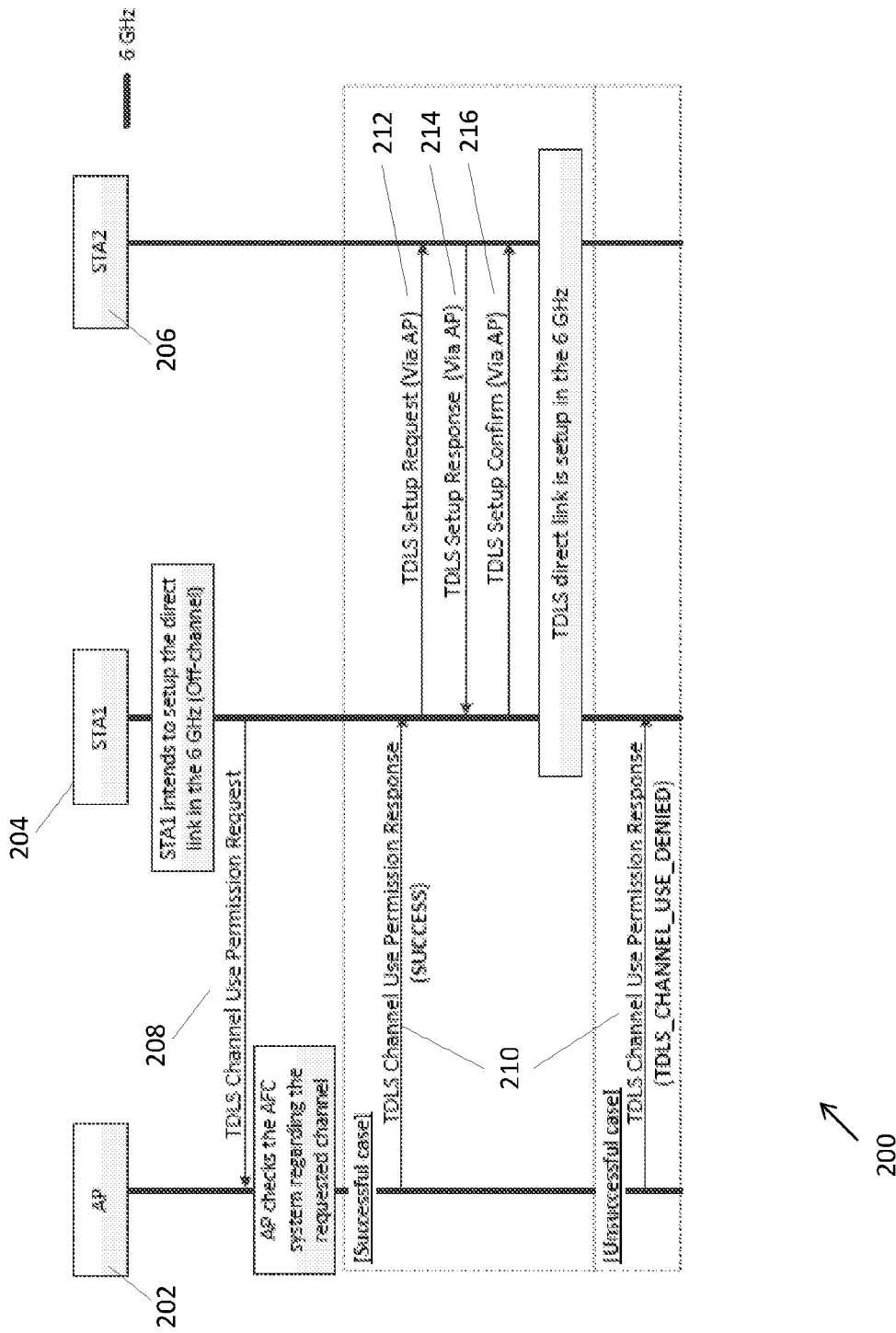
FIG. 2 depicts a message flow illustrating a TDLS setup in an off-channel in the 6 GHz band according to a first embodiment.

FIG. 2 depicts a message flow illustrating a TDLS setup in an off-channel in the 6 GHz band according to a first embodiment. AP 202 may be an ADD enabling STA. Non-AP STA 204 and no-AP STA 206 are associated with the AP 202 in a channel in the 6 GHz band. For various reasons, non-AP STA 204 and no-AP STA 206 may choose to communicate over a direct link in a channel that is different from the operating channel of the BSS. Due to regulatory requirements in the 6 GHz band, prior to any transmissions on a channel, it may be mandatory to ensure the availability of the channel from an AFC system. Non-AP STA 204, as a TDLS initiator STA, may seek permission from the AP 202 to use a different channel in the 6 GHz band for direct link communication with non-AP STA 206 by transmitting a TDLS Channel Use Permission Request frame 208 to the AP 202. The channel may for example be a channel in the U-NII-5 or the U-NII-7 sub-bands of the 6 GHz band that is different from the base channel in the 6 GHz band used for communication among the AP 202 and the STAs 204 and 206.

After receiving the TDLS Channel Use Permission Request frame 208 from the STA 204, the AP 202 checks the AFC Database (for example via the AFC system) regarding availability of the requested channel. In a successful case, the AP 202 may transmit a TDLS Channel Use Permission Response frame 210 with a status of SUCCESS to the STA 204 to indicate the requested channel is available for direct link communication. The STA 204 may then initiate the setting up of a direct link on the requested channel with the STA 204 by transmitting, via the AP 202, a TDLS Setup Request frame 212 to the STA 206. The STA 206 may then respond by transmitting, via the AP 202, a TDLS Setup Response frame 214 to the STA 204. Thereafter, the STA 204 transmits, via the AP 202, a TDLS Setup Confirm frame 216 to the STA 206, and the TDLS direct link is setup on the requested channel in the 6 GHz band. In an unsuccessful case where the requested channel is not available based on the AFC Database check, the AP 202 may transmit a TDLS Channel Use Permission Response frame 210 with an unsuccessful status (for example TDLS_CHANNEL_USE_DENIED) to the STA 204 to indicate that permission to use the requested channel for direct link communication is denied.

Figure 3:
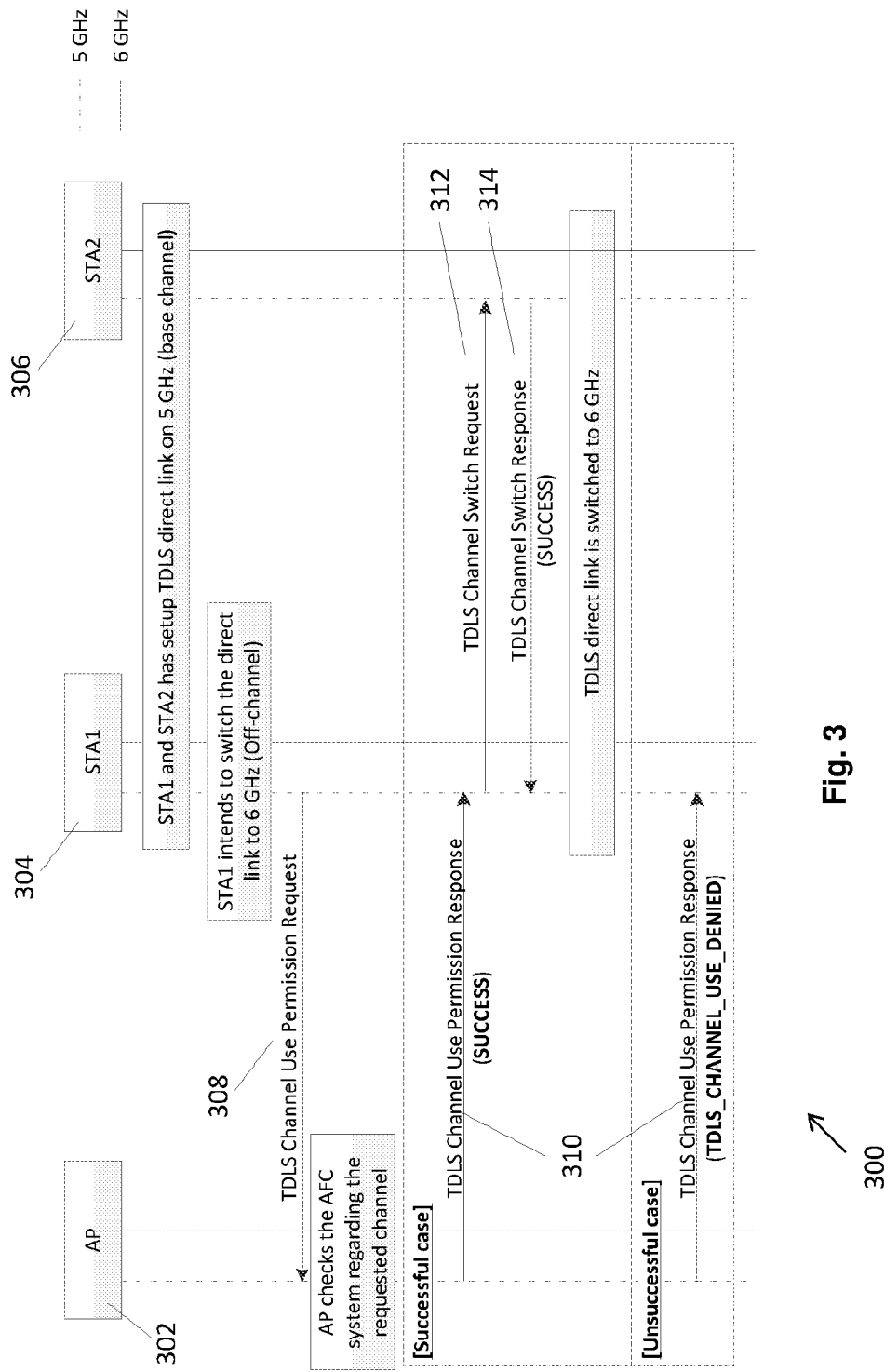
FIG. 3 depicts a message flow illustrating a TDLS channel switch to an off-channel in the 6 GHz band according to the first embodiment.

FIG. 3 depicts a message flow illustrating a TDLS direct link channel switch to an off-channel in the 6 GHz band according to a first embodiment. In this example, non-AP STAs 304 and 306 are associated with AP 302 on a channel in the 5 GHz band and have already setup a TDLS direct link on the base channel. However, STA 304 intends to switch the direct link to an off-channel in the 6 GHz band. Therefore, the STA 304, as a TDLS initiator STA, may seek permission from the AP 302 to use another channel in the 6 GHz band for direct link communication with STA 306 by transmitting a TDLS Channel Use Permission Request frame 308 to the AP 302. The channel may for example be a channel in the 6 GHz band that is different from the base channel in the 5 GHz band used for communication among the AP 302 and the STAs 304 and 306.

After receiving the TDLS Channel Use Permission Request frame 308 from the STA 304, the AP 302 checks the AFC Database regarding availability of the requested channel. In a successful case, the AP 302 may transmit a TDLS Channel Use Permission Response frame 310 with a status of SUCCESS to the STA 304 to indicate the requested channel is available for direct link communication. The STA 304 may then initiate the switching of the direct link with the STA 304 to the requested channel on the 6 GHz band by transmitting a TDLS Channel Switch Request frame 312 to the STA 306. The STA 306 may then respond by transmitting a TDLS Channel Switch Response frame to the STA 304 with a SUCCESS status, and the TDLS direct link is switched to the requested channel in the 6 GHz band. In an unsuccessful case where the requested channel is not available based on the AFC Database check, the AP 302 may transmit a TDLS Channel Use Permission Response frame 310 with an unsuccessful status to the AP 304 to indicate that permission to switch the direct link to the requested channel is denied.

It would be appreciated that If STA 204/304 (TDLS initiator STA) has the capability to directly check the AFC Database regarding the use of the off-channel in the 6 GHz band for direct link (for example through a cellular internet link), it need not seek permission from the AP 202/302 and may directly proceed to setup/switch direct link to the off-channel.

Figure 4A:
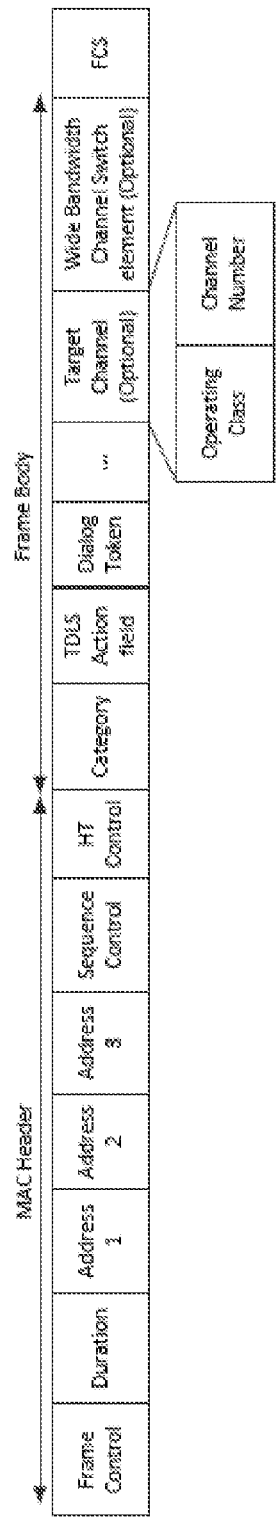
FIG. 4A shows a format of a TDLS Setup Request frame used for requesting a TDLS direct link setup according to various embodiments.

FIG. 4A shows a format of a TDLS Setup Request frame 400 used for requesting a TDLS direct link setup according to various embodiments. The TDLS Setup Request frame 400 may be used in the form of the TDLS Setup Request frame 212 transmitted by the STA 202 via the AP 202 to the STA 204 as shown in FIG. 2. The TDLS Setup Request frame 400 may include (or consist of) a Frame Control field, Duration field, one or more Address fields, a Sequence Control field, a HT Control field, a Category field, a TDLS Action field, a Dialog Token field, a Target Channel (Optional) field, a Wide Bandwidth Channel Switch element (Optional) field and a FCS (frame check sequence) field. The Target Channel field may include (or consist of) an Operating Class field and a Channel Number field. The Channel Number field may indicate a channel to be used for the requested direct link communication. The Target Channel field and the Wide Bandwidth Channel Switch element field may be present in the TDLS Setup Request frame 400 to request the TDLS setup on a channel that is different from the base channel. Further, the Wide Bandwidth Channel Switch element field may be present if the TDLS Setup Request frame 400 is to be used for requesting a channel that is wider than 20 MHz. Although not shown in the figure, if the TDLS link is to be setup on a different frequency band, and if the STA's MAC address on that frequency band is different from the band in which the base channel lies, the MAC address on the other band may also be included in the TDLS Setup Request frame. If the peer STA accepts the TDLS setup request, it may also include its MAC address on the other band in the TDLS Setup Request Response frame. If required, the setup of the TDLS link on a different channel may also trigger the setup of the TDLS PeerKey (TPK) security association on the other channel.

Figure 4B:
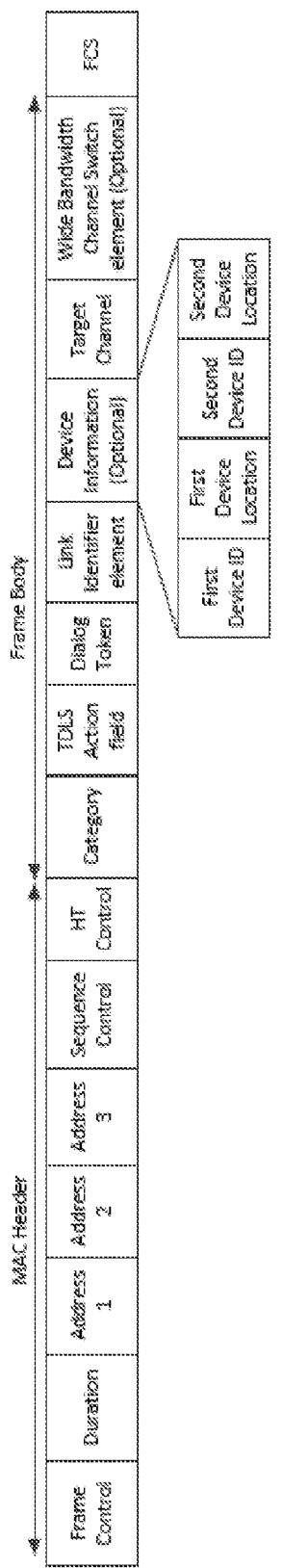
FIG. 4B shows a format of a TDLS Channel Use Permission Request frame used for requesting permission to use a channel for direct link communication according to the first embodiment.

FIG. 4B shows a format of a TDLS Channel Use Permission Request frame 410 used for requesting permission to use a channel for direct link communication according to the first embodiment. The TDLS Channel Use Permission Request frame 410 may be used in the form of the TDLS Channel Use Permission Request frame 208/308 transmitted by the STA 202/302 to the AP 202/302 as shown in FIG. 2 and FIG. 3. The TDLS Channel Use Permission Request frame 410 may include (or consist of) a Frame Control field, Duration field, one or more Address fields, a Sequence Control field, a HT Control field, a Category field, a TDLS Action field, a Dialog Token field, a Link Identifier element field, a Device Information (Optional) field, a Target Channel field, a Wide Bandwidth Channel Switch element (Optional) field and a FCS field. The Device Information field may include (or consist of) a First Device ID field, a First Device Location field, a Second Device ID field and a Second Device Location field. The Device ID, for example, may be the FCC ID of the device and may be used by the AFC system to verify if the device may be used in that channel. Similarly, the Device Location fields may provide information of the device's geographic location, for example, the latitude, longitude and optionally antenna height. The Target Channel field may include (or consist of) an Operating Class field and a Channel Number field (not shown) identifying the channel requested for direct link communication. Further, the Wide Bandwidth Channel Switch element field may be present if requesting a channel that is wider than 20 MHz. The device location information may be used by the AFC system to calculate whether transmission from either TDLS devices on the requested channel may cause interference to licensed users operating in the vicinity. The AFC system may take in consideration many factors including the information of the licensed users' receive antenna, the topography of the terrain (whether rural, urban, semi-rural) etc. in making such determination. If the AFC system determines that direct link transmissions in the request channel do not cause any interference to the licensed users in the vicinity, permission to use the requested channel for direct link communication may be granted. In other cases, the AFC system may simplify the interference calculations by using the information about the AP (location, antenna height etc.) to perform the interference calculation, under the presumptions that if transmission by the AP on the requested channel does not cause interference to the licensed users, then transmissions by any of the client devices (i.e. the TDLS STAs) also would not cause any interference to the licensed users.

Figure 4C:
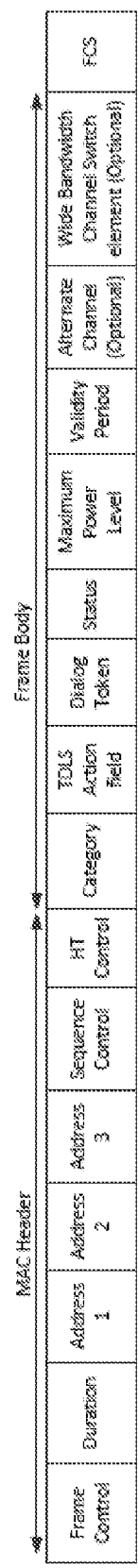
FIG. 4C shows a format of a TDLS Channel Use Permission Response frame used for responding to the TDLS Channel Use Permission Request frame according to the first embodiment.

FIG. 4C shows a format of a TDLS Channel Use Permission Response frame 420 used for responding to the TDLS Channel Use Permission Request frame 410 according to the first embodiment. The TDLS Channel Use Permission Response frame 420 may be used in the form of the TDLS Channel Use Permission Response frame 210/310 transmitted by the AP 202/302 to the STA 202/302 as shown in FIG. 2 and FIG. 3. The TDLS Channel Use Permission Response frame 420 may include (or consist of) a Frame Control field, a Duration field, one or more Address fields, a Sequence Control field, a HT Control field, a Category field, a TDLS Action field, a Dialog Token field, a Status field, a Maximum Power Level field, a Validity Period field, an Alternate Channel (Optional) field, a Wide Bandwidth Channel Switch element (Optional) field and a FCS field.

The Status field may indicate "SUCCESS" for cases where the channel requested in the TDLS Channel Use Permission Request frame is available for direct link communication, and may indicate "TDLS_CHANNEL_USE_DENIED" for cases where the channel requested in the TDLS Channel Use Permission Request frame (for example, the channel indicated in the Channel Number field of the TDLS Channel Use Permission Request frame) is not available for direct link communication. If the Status is not SUCCESS, AP may include the Alternate Channel field and the Wide Bandwidth Channel Switch element in the TDLS Channel Use Permission Response frame to recommend a different channel for direct link communication. The TDLS Channel Use Permission Response frame 420 may also include applicable transmission parameters (e.g. Maximum Transmit Power level), the validity period for the use of the channel etc.

The Maximum Power Level field may indicate a maximum power, in units of 0.5 dBm, allowed to be transmitted on the channel indicated in the Channel Number field. The Validity Period field may indicate a time period for which the Channel Use Permission is valid. The STA is expected to seek permission again from the associated AP upon expiry of the validity period by, for example, transmitting another TDLS Channel Use Permission Request frame to the associated AP. It will be appreciated that the TDLS Channel Use Permission Request/Response frames are transmitted directly to/from the AP without Data encapsulation.

Figure 5:
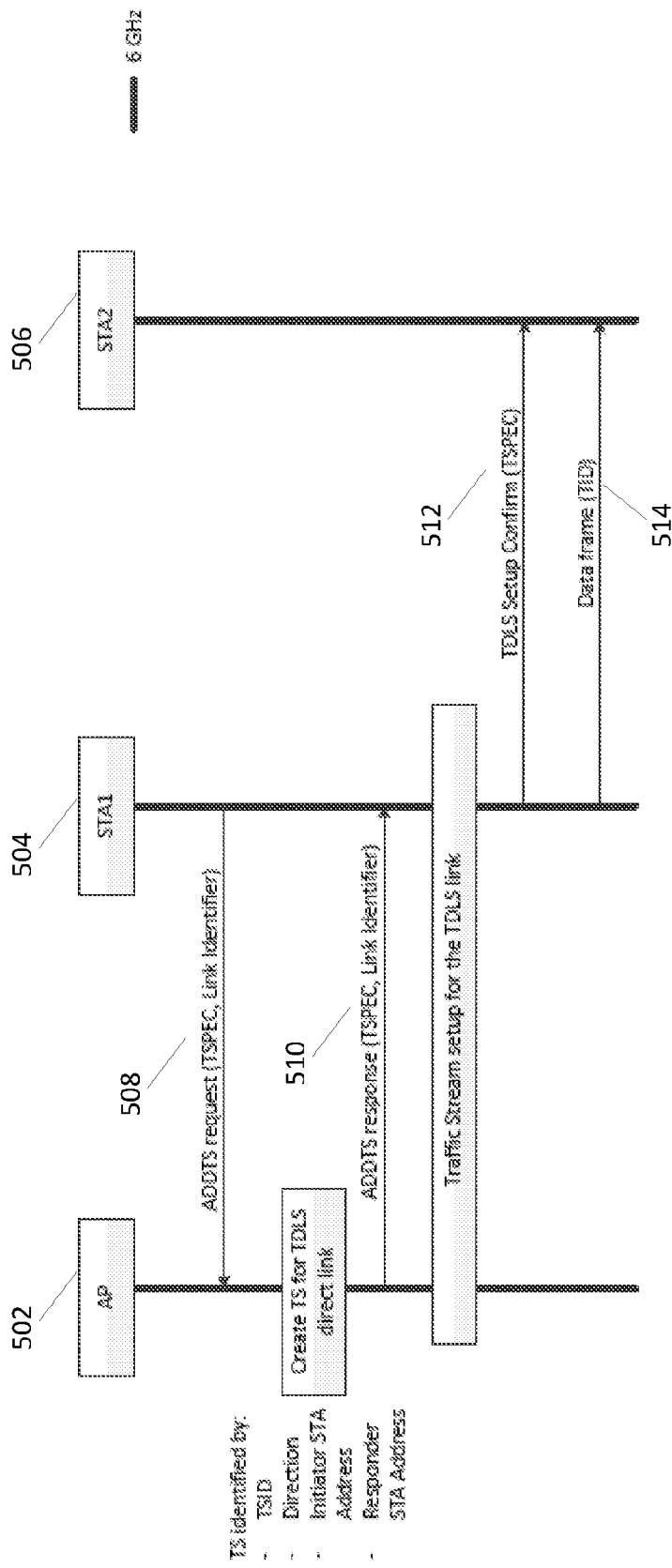
FIG. 5 depicts a message flow illustrating a setting up of a traffic stream for a TDLS direct link in the 6 GHz band according to the first embodiment.

In addition, prior to transmitting Data frames on a TDLS direct link on the 6 GHz band, a non-AP STA may be required to setup a Traffic Stream (TS) for the TDLS direct link. FIG. 5 depicts a message flow illustrating a setting up of a TS for a TDLS direct link on a channel in the 6 GHz band according to the first embodiment. STA 504 may transmit an ADDTS (Add Traffic Stream) Request frame 508 to AP 502. The ADDTS request frame 508 may comprise information identifying the TDLS direct link. For example, the STA 504 may include a Link Identifier element in the ADDTS request frame 508 to indicate TS for TDLS and to identify the addresses of an Initiator STA (for example, STA 504) and a Responder STA (for example, STA 506). If the AP 502 permits the TS, the AP 502 then creates the TS for the TDLS direct link. Having information about both STAs involved in a TDLS link may also help the AP to make better decisions, for example if the AP knows that the two STAs are physically close to each other, the AP may provide more transmissions opportunities for the direct link, while the AP may refuse the traffic setup request between STAs that are far from each other in order to prevent interference to other STAs.

Further, the AP 502 may transmit an ADDTS response frame 510 to the STA 504 and include a Link Identifier element in the ADDTS response frame 510, the Link Identifier element indicating the TDLS link. If the TS is bi-directional, STA 504 may transmit a TDLS Setup Confirm frame 512 to the STA 506 to inform STA 606 of the successful TS setup, TDLS Setup Confirm frame 512 may indicate a TSPEC (Traffic Specification)/TID (Traffic ID) of the TS. Alternatively, STA 506 may repeat the TS setup for the opposite direction. For this example, it is assumed that TDLS direct link is already setup between the STA 504 and STA 506. Otherwise, the two STAs 504 and 506 may perform a TDLS setup right after the successful setup of the Traffic Stream for the TDLS link. After the successful TS Setup, one or more Data frames 514 belonging to the TID may then be transmitted on the TDLS direct link. If TS is required for the TDLS direct link, data frame transmission on the TDLS direct link is not allowed if the TDLS TS setup fails. Advantageously, setting up the TS by the AP 502 allows the AP 502 to establish control over the communication traffic between the non-AP STAs 504 and 506.

Figure 6:
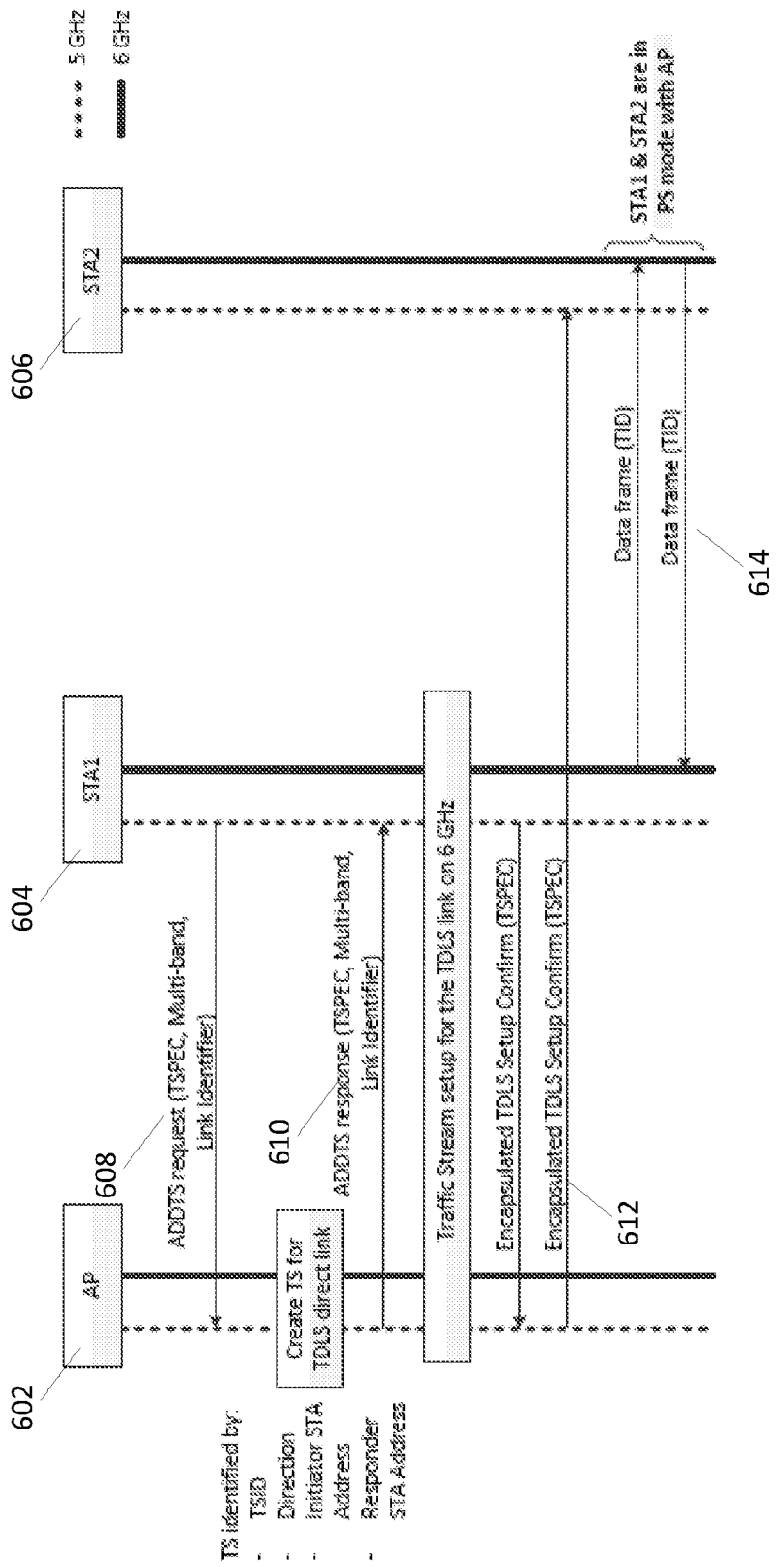
FIG. 6 depicts a flowchart illustrating a setting up of a multi-band traffic stream for a TDLS direct link in the 6 GHz band according to the first embodiment.

If the BSS operating channel is on the 5 GHz or 2.4 GHz band and the TDLS direct link is switched to a channel in the 6 GHz band (off channel case), the TDLS TS may be setup for the 6 GHz band but the actual TDLS TS setup is performed on the BSS operating channel. FIG. 6 depicts a message flow illustrating a setting up of a traffic stream for a TDLS direct link on a 6 GHz band off channel according to the first embodiment. STA 604 may transmit an ADDTS Request frame 608 on the BSS operating channel to AP 602. The ADDTS request frame 608 may comprise information identifying the TDLS direct link. For example, the STA 604 may include a Link Identifier element in the ADDTS request frame 608 to indicate TS for TDLS and to identify the addresses of an Initiator STA (for example, STA 604) and a Responder STA (for example, STA 606). Further, the ADDTS request frame 608 may include a multi-band element indicating the 6 GHz band and a channel to be switched to in the 6 GHz band. If the AP 602 permits the TS, the AP 602 then creates the TS for the TDLS direct link on the 6 GHz band.

Further, the AP 602 may transmit an ADDTS response frame 610 on the BSS operating channel to the STA 604 and include a Link Identifier element in the ADDTS response frame 610, the Link Identifier element indicating the TDLS link. Further, the ADDTS response frame 610 may include a multi-band element indicating a channel to be switched to in the 6 GHz band. STA 604 may then transmit a TDLS Setup Confirm frame 612 to the STA 606 via the AP 602 (i.e. encapsulated in data frames) to inform STA 606 of the successful TS setup. The TDLS Setup Confirm frame 612 may indicate a TSPEC (Traffic Specification)/TID (Traffic ID) of the TS. For this example, it is assumed that TDLS direct link is already setup on the 6 GHz channel between the STA 504 and STA 506. After the successful TS Setup, one or more Data frames 514 belonging to the TID may then be transmitted on the TDLS direct link, wherein the STA 604 and STA 606 may be in PS (power-save) mode with the AP 602. Advantageously, setting up the TS by the AP 602 allows the AP 602 to establish control over the communication traffic between the non-AP STAs 604 and 606.

Figure 7:
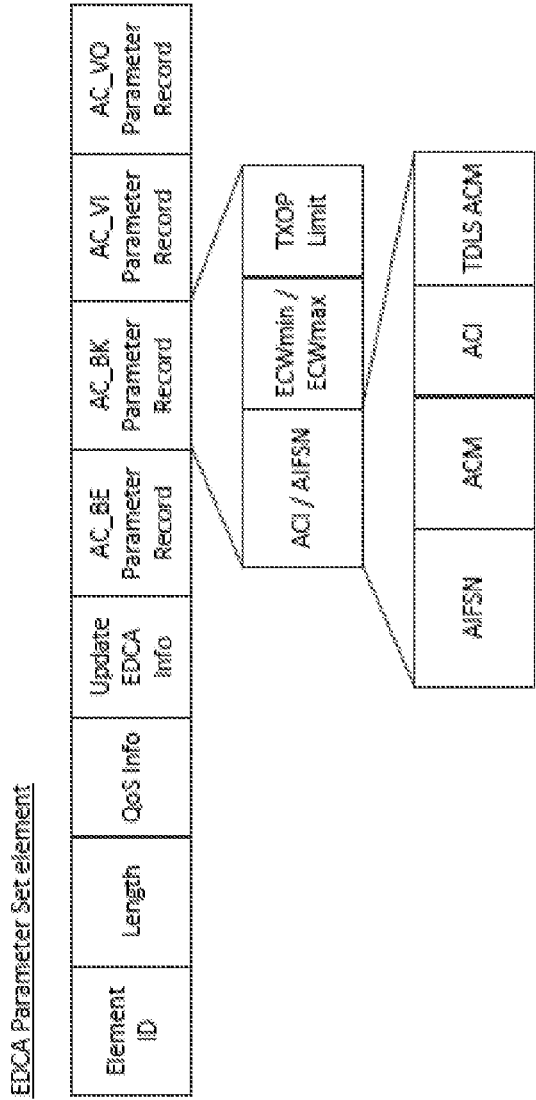
FIG. 7 shows a format of an EDCA (Enhanced Distributed Channel Access) Parameter Set element according to the first embodiment.

An AP may indicate that a TDLS TS setup is required for an AC (Access Category) in the 6 GHz band by setting the "TDLS ACM" bit in the Parameter Record field of the AC in the EDCA (Enhanced Distributed Channel Access) Parameter Set element transmitted in the Beacon/Probe Response frames of the 6 GHz band. FIG. 7 shows a format of an EDCA Parameter Set element 700 according to the first embodiment. The EDCA Parameter Set element 700 may include (or consist of) an Element ID field, a Length field, a QoS Info field, an Update EDCA Info field, an AC_BE Parameter Record field, an AC_BK Parameter Record field, an AC_VI Parameter field and an AC_VO Parameter Record field. The AC_BK Parameter Record field may include (or consist of) an ACI/AIFSN field, an ECWmin/ECWmax field and a TXOP Limit field. The ACI/AIFSN field may include (or consist of) an AIFSN subfield, an ACM subfield, an ACI subfield and a TDLS ACM subfield. If the TDLS ACM subfield bit is set, Data transmission on a TDLS direct link in the 6 GHz band is only allowed after a STA has setup a TDLS TS with the AP for that AC (regardless of the setting of the ACM bit for that AC). On the other hand, if the TDLS ACM subfield bit is not set, data transmission is allowed for that AC on the TDLS direct link in the 6 GHz band without requiring a TS setup. Advantageously, the TDLS ACM subfield enables the AP to have more control over direct link communications in non-AP STAs.

Figure 8:
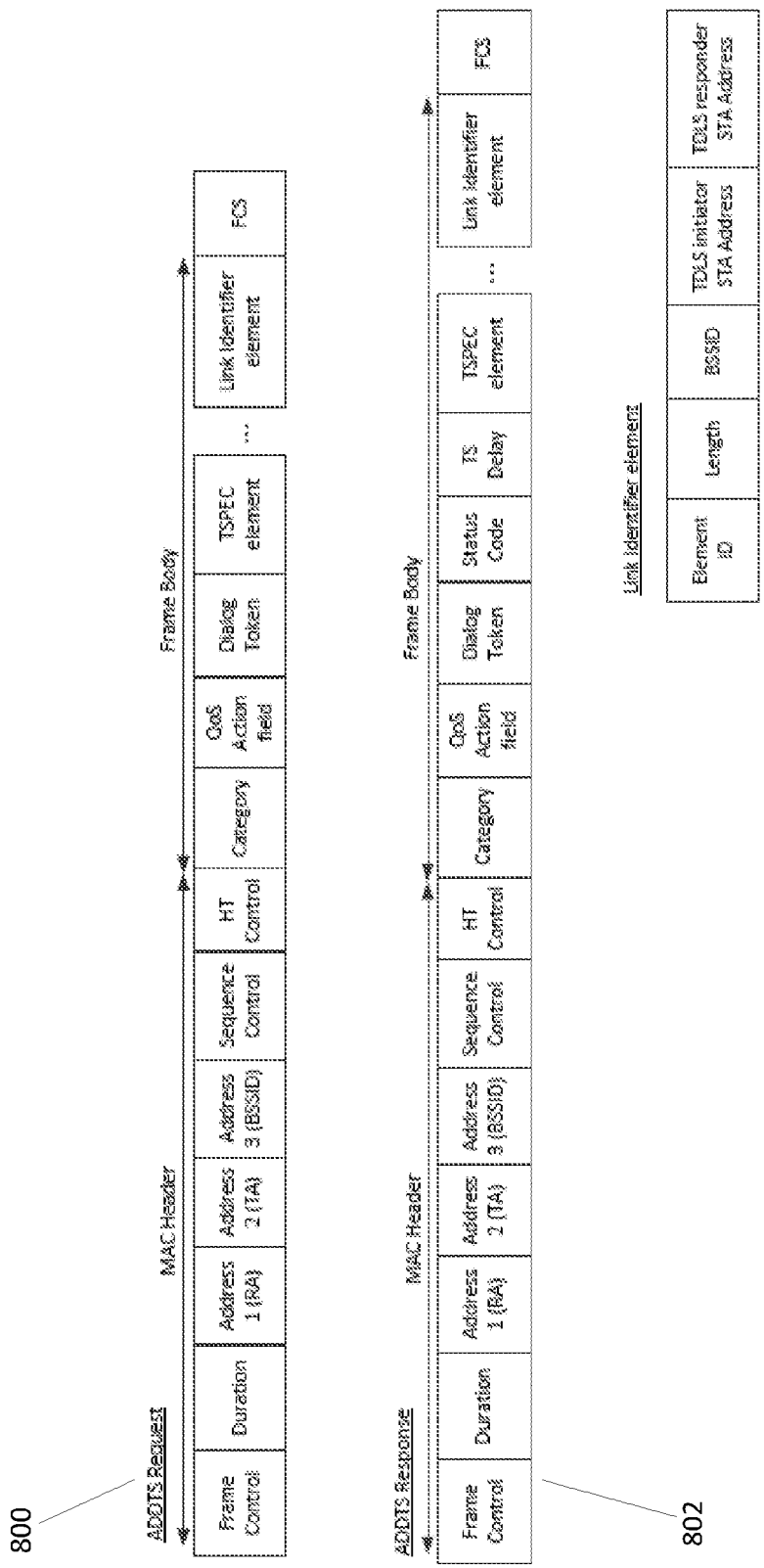
FIG. 8 shows a format of an ADDTS (Add Traffic Stream) Request frame and an ADDTS Response frame according to the first embodiment.

FIG. 8 shows a format of an ADDTS Request frame 800 and an ADDTS Response frame 802 according to the first embodiment. The ADDTS Request frame 800 may be used in the form of the ADDTS Request frame 508/608 transmitted by the STA 504/604 to the AP 502/602 as shown in FIG. 5 and FIG. 6. The ADDTS Request frame 800 may include (or consist of) a Frame Control field, a Duration field, an Address 1 (RA) field, an Address 2 (TA) field, an Address 3 (BSSID) field, a Sequence Control field, a HT Control field, a Category field, a QoS Action field, a Dialog Token field, a TSPEC element field, a Link Identifier element and a FCS field. As shown in the examples of FIG. 5 and FIG. 6, the ADDTS Request frame is transmitted by the initiator STA to the AP to request for the AP to setup a TS for the direct link.

The ADDTS Response frame 802 may be used in the form of the ADDTS Request frame 510/610 transmitted by the AP 502/602 to the STA 504/604 as shown in FIG. 5 and FIG. 6. The ADDTS Response frame 802 may include (or consist of) a Frame Control field, a Duration field, an Address 1 (RA) field, an Address 2 (TA) field, an Address 3 (BSSID) field, a Sequence Control field, a HT Control field, a Category field, a QoS Action field, a Dialog Token field, a Status Code field, a TS Delay field, a TSPEC element field, a Link Identifier element and a FCS field. As shown in the examples of FIG. 5 and FIG. 6, the ADDTS Response frame is transmitted by the AP to the initiator STA to confirm that the TS is setup. The TDLS direct link may be identified in the ADDTS Request/Response frames by the Link Identifier element field, which may include (or consist of) an Element ID field, a Length field, BSSID field, a TDLS Initiator STA Address field and a TDLS Responder STA Address field.

Figure 9:
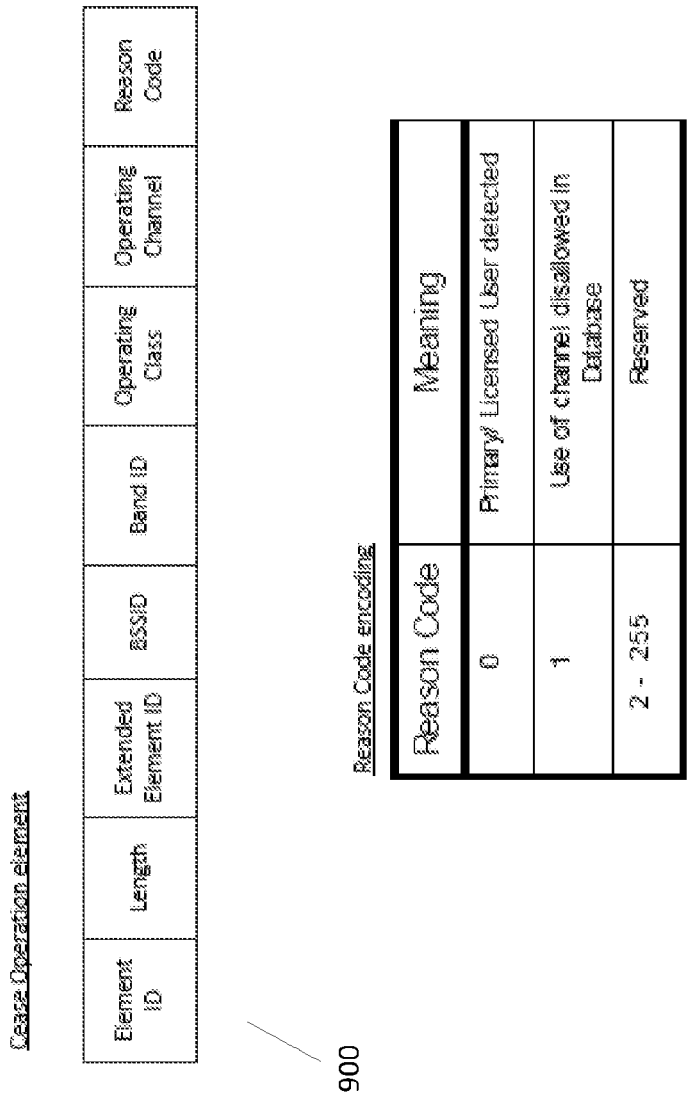
FIG. 9 shows a format of a Cease Operation element used for a cease operation instruction according to the first embodiment.

An AP may instruct an associated non-AP STA to cease operation on a TDLS direct link in the 6 GHz band by including the Cease Operation element in broadcast/unicast frames addressed to the STA. For example, this cease operation instruction may be sent by an AP upon detecting Primary User of the spectrum (e.g. due to change in the AFC database), or upon instruction from the AFC system, or other similar situations. Such requirements to cease operation may include immediate stopping of all ongoing transmissions and may be mandated by regulatory bodies to protect the licensed users of the spectrum from harmful interference. FIG. 9 shows a format of a Cease Operation element 900 used for a cease operation instruction according to the first embodiment. The Cease Operation element 900 may include (of consist of) an Element ID field, a Length field, an Extended Element ID field, a BSSID field, Band ID field, an Operating Class field, an Operating Channel field and a Reason Code field. The Band ID field (if present), the Operating Class field, and the Operating Channel field together identify the frequency band and the channel for which the cease operation applies. The Reason Code field may indicate the reason for requiring the STA to cease operating on the direct link, such as a value of "0" to indicate that a primary or licensed use has been detect, a value of "1" to indicate that use of the channel has been disallowed in the AFC database by the AFC system, or other values 2-255 that may be reserved for other reasons. For example, some other reasons may be lodging of an interference report with the AFC system by a licensed user of the channel.

After a STA receives a cease operation instruction from an AP with the Cease Operation element 900, the STA shall cease all operation on the TDLS direct link in the indicated channel. This may involve, for example, stopping transmissions on the direct link, tearing down the direct link or deleting the TDLS TS associated with the direct link. Advantageously, an AP can control the TDLS direct link setup/transmissions in the 6 GHz band using the cease operation instruction.

Figure 10:
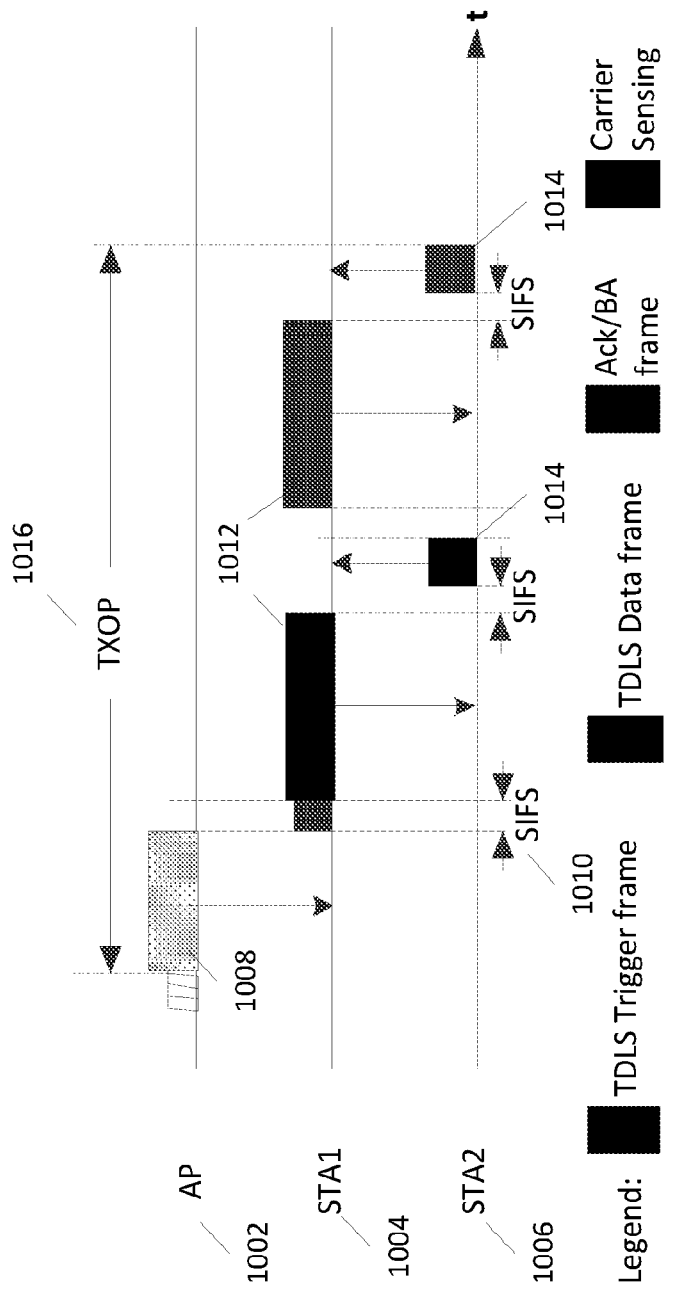
FIG. 10 depicts a flow chart illustrating a direct link communication between two STAs over a TXOP (Transmission Opportunity) according to a second embodiment.

In a second embodiment, an AP may only permit scheduled transmissions of Data frames even in the TDLS direct links, whereby the TDLS Data frame transmissions may require receipt of a TDLS Trigger frame from the AP. Although requiring TDLS STAs to setup TS for TDLS links may provide some control to the AP over the transmissions on the TDLS link, in some regulatory domains, the AP may be required to have a much stricter control over which STA may transmit on the wireless medium and at what time. In such scenarios, the AP may disable all contention based transmissions (e.g. EDCA) and only allow transmission scheduled by the AP. Upon receiving a TDLS Trigger frame, the TDLS initiator STA may transmit one or more Data frames to the TDLS responder STA on the TDLS direct link within the TXOP duration. FIG. 10 depicts a message flow illustrating a direct link communication between two STAs over a TXOP according to the second embodiment. AP 1002 may generate and transmit a TDLS Trigger frame 1008 to STA 1004. The STA 1004 receives the TDLS Trigger frame 1008 and, after a SIFS (Short Interframe Spacing) 1010, transmit one or more TDLS Data frames 1012 to STA 1006 within a TXOP 1016. The STA 1004 may acknowledge each received TDLS Data frame 1012 from the AP 1004 by transmitting an acknowledgement frame 1014 (ACK frame or BlockAck frame) to the STA 1004. In various embodiments, the TDLS Trigger frame 1008 may include information indicative of a MAC address of the STA 1004, an Allowed Access Category (AC) and a maximum transmission power level, wherein the one or more data frames are to be transmitted to the MAC Address and are from a TID specified in the Allowed AC or a higher AC, and wherein the one or more data frames are transmitted with a transmission power that is lesser than the maximum transmission power level.

EDCA based transmission of Data frames is disallowed on the TDLS direct link. Further, such triggered transmissions according to the second embodiment are only possible when the TDLS direct link is in the base channel. Therefore, TDLS channel switching to an off channel in the 6 GHz band may be disallowed. The AP 1002 may use the parameters of the TDLS TS as well as a TDLS Buffer Status Report to schedule the transmission of the TDLS Trigger frame 1008.

Figure 11A:
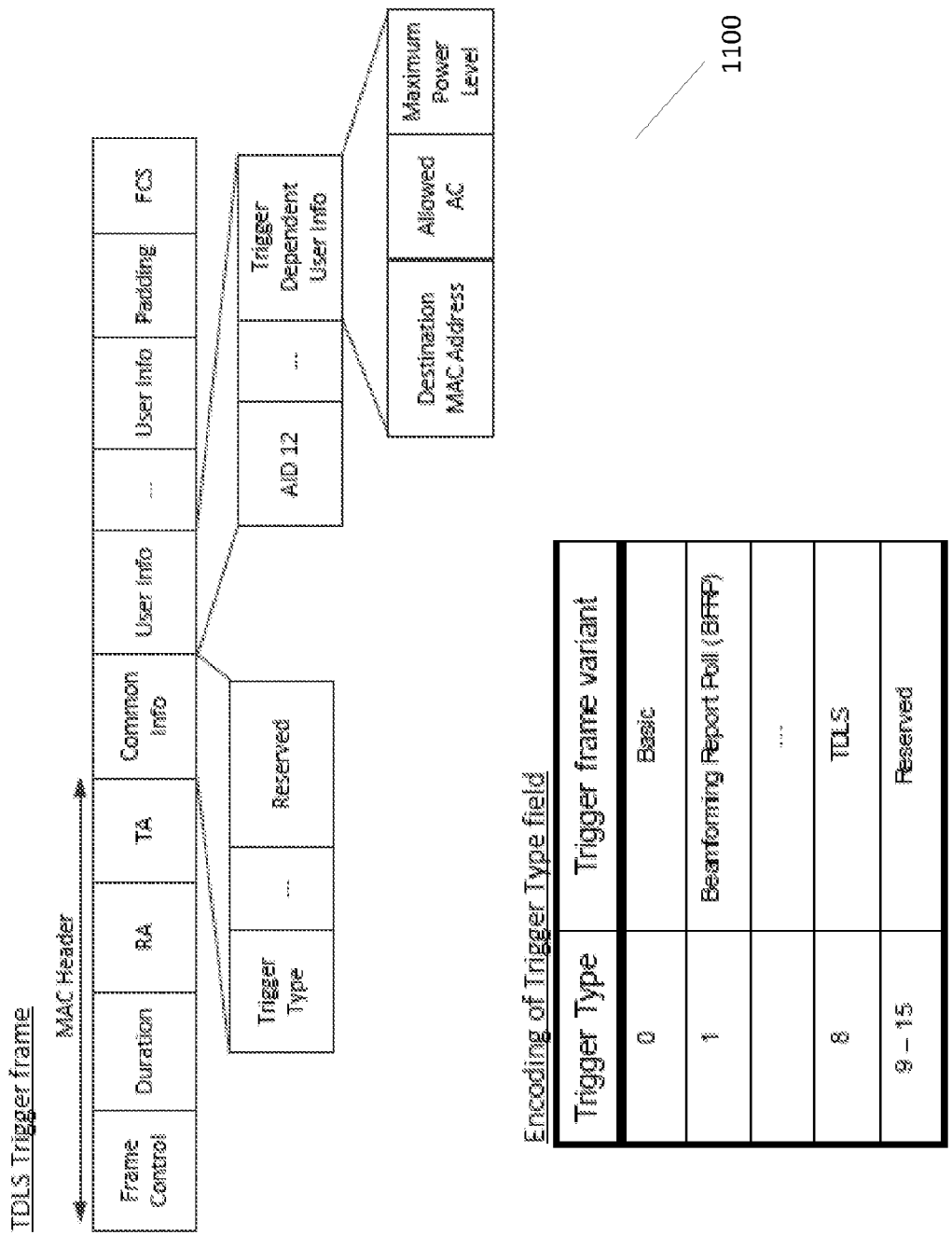
FIG. 11A shows a format of a TDLS Trigger frame used for initiating a direct link communication according to the second embodiment.

FIG. 11A shows a format of a TDLS Trigger frame 1100 used for initiating a direct link communication according to the second embodiment. The TDLS Trigger frame 1100 may be utilised in the form of the TDLS Trigger frame 1008 as shown in FIG. 10. The TDLS Trigger frame 1100 may include (or consist of) a Frame Control field, a Duration field, a RA field, a TA field, a Common Info field, User Info field, a Padding field and a FCS field. The RA field may be set to, for example, the MAC address of the TDLS initiator STA. In the example as shown in FIG. 10, this would be the MAC address of STA 1004 which transmits the Data frames 1012. The Common Info field may include a Trigger Type field, wherein the Trigger Type field may contain a value of "8" to indicate the frame is a TDLS Trigger frame. All other fields in the Common Info field except Trigger Type field and CS Required field may be reserved. Trigger Dependent Common Info field is not present. The User Info field may include an AID12 field and a Trigger Dependent User Info field. Only a single User Info field may be present. The AID 12 field may be set to the AID of the TDLS initiator STA. In the example as shown in FIG. 10, this would be the AID of STA 1004. The Trigger Dependent User Info field may further include (or consist of) a Destination MAC address field, an Allowed AC field and a Maximum Power Level field. The Destination MAC address field may indicate, for example, the MAC address of the TDLS responder STA. In the example as shown in FIG. 10, this would be the MAC address of STA 1006 which is the intended recipient of the Data frames 1012. All other fields of the Trigger Dependent User Info field may be reserved. The TDLS initiator STA receiving the TDLS Trigger frame 1100 may be allowed to transmit Data frames addressed to the TDLS responder STA from any of the TIDs from the AC indicated in the Allowed AC field or any higher priority AC.

Figure 11B:
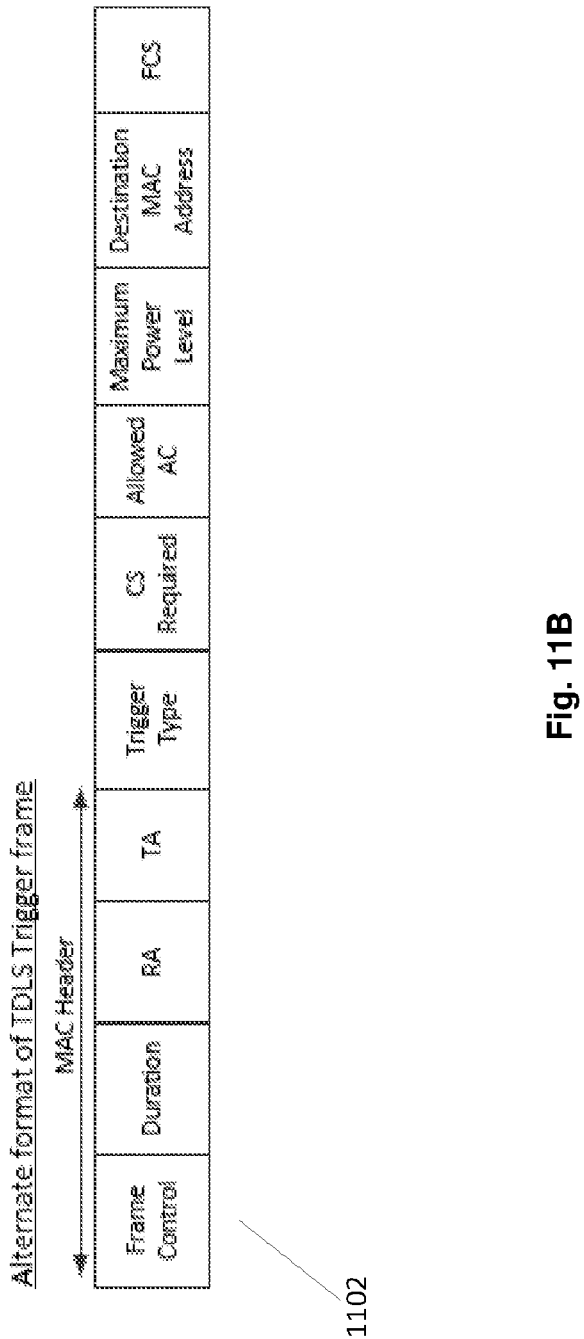
FIG. 11B shows an alternative format of a TDLS Trigger frame used for initiating a direct link communication according to the second embodiment.

FIG. 11B shows an alternative format of a TDLS Trigger frame used for initiating a direct link communication according to the second embodiment. Alternatively, the TDLS Trigger frame format may be simplified to a form as shown with TDLS Trigger frame 1102. The TDLS Trigger frame 1102 may include (or consist of) a Frame Control field, a Duration field, a RA field, a TA field, a Trigger Type field, a CS Required field, an Allowed AC field, a Maximum Power Level field, a Destination MAC address field and a FCS field. Accordingly, the TDLS Trigger frame 1008 of FIG. 10 may also be in the form of the simplified TDLS Trigger frame 1102.

Figure 12:
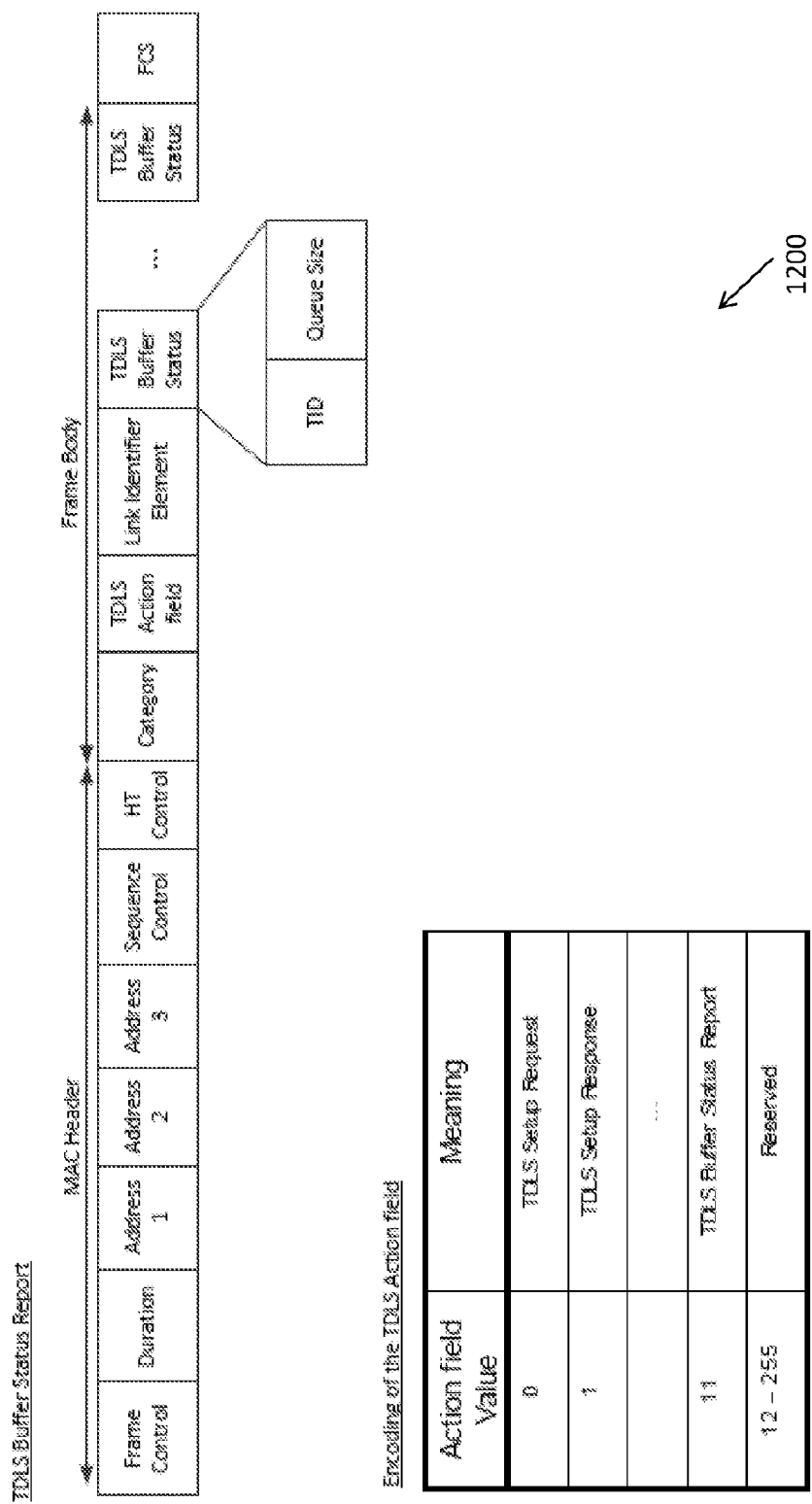
FIG. 12 shows a format of a TDLS Action frame used for reporting TDLS buffer status according to the second embodiment.

Further, a new TDLS Action frame (TDLS Buffer Status Report) may be defined for a STA to report its TDLS Buffer status to the AP. FIG. 12 shows a format of a TDLS Action frame 1200 used for reporting TDLS buffer status according to the second embodiment. The TDLS Buffer Status Report frame 1200 may include (or consist of) a Frame Control field, a Duration field, an Address 1 field, an Address 2 field, an Address 3 field, a Sequence control field, a HT Control field, a Category field, a Link Identifier Element field, one or more TDLS Buffer Status fields and a FCS field. Each TDLS Buffer Status field may include (or consist of) a TID field and a Queue Size field. The TDLS Action field may have a value, for example, of "11" to indicate that the action frame is a TDLS Buffer Status Report frame. The Link Identifier Element field may contain information identifying the TDLS link. The TID may indicate a TID corresponding to TDLS Data frames. The Queue Size field may indicate the queue size of the TID corresponding to the Data frames addressed to the TDLS peer STA, and may utilise the same encoding as the Queue size subfield of the QoS Control field. The TID field may also correspond to the TSID, if a TS is setup for the TDLS direct link.

The TDLS Buffer Status Report frame 1200 may be transmitted directly to/from an AP without Data encapsulation. Advantageously, the AP can use the information provided in the TDLS Buffer Status Report frame 1200 to dynamically schedule TDLS Trigger frame 1100/1102 to initiate TDLS transmissions in the 6 GHz band.

An AP may indicate, for example, in the Extended Capabilities field in Beacon/Probe Response frames, whether a TS setup is required for the TDLS direct link in 6 GHz (bit #83) and/or whether a Trigger frame is required for Data frame transmissions on the TDLS direct link in 6 GHz (bit #84). Table 1 below shows the bit values that an AP may use for the Extended Capabilities field in the Beacon/Probe Response frames to indicate the above-mentioned requirements. Advantageously, the AP may have more control over the requirements for enabling TDLS direct link transmissions in 6 GHz band.

transmission. The TDLS CTS frame 1302 may include (or consist of) a Frame Control field, a Duration field, a RA field, a Destination MAC Address field and a FCS field. Similar to the Destination MAC Address field of the TDLS RTS frame 1300, the Destination MAC Address field of the TDLS CTS frame 1302 may be set to the MAC address of the TDLS responder STA. The presence of the Destination MAC Address field differentiates the TDLS CTS frame from the regular CTS frame.

According to the third embodiment, transmission of Data frames on the TDLS direct link may only be allowed after RTS/CTS exchange with the AP. Further, transmissions may only be possible when the TDLS direct link is in the base channel, such that TDLS channel switching to an off channel in the 6 GHz band is disallowed. Advantageously, the RTS/CTS exchange enables the AP to dynamically allow/refuse TDLS transmissions in the 6 GHz band. One advantage of using this RTS/CTS sequence to initiate the communication on the TDLS link is that the AP is relieved of the scheduling burdens on the TDLS link and the TDLS initiator

TABLE 1

| Bit | Information | Notes |
|---|---|---|
| 38 | TDLS Prohibited | The TDLS Prohibited subfield indicates whether the use of TDLS is prohibited. The field is set to 1 to indicate that TDLS is prohibited and to 0 to indicate that TDLS is allowed. |
| 39 | TDLS Channel Switching Prohibited | The TDLS Channel Switching Prohibited subfield indicates whether the use of TDLS Channel Switching is prohibited. The field is set to 1 to indicate that TDLS Channel Switching is prohibited and to 0 to indicate that TDLS Channel Switching is allowed. |
| . . . | | |
| 83 | TDLS TS Setup Required in 6 GHz | The TDLS TS Setup Required in 6 GHz subfield indicates whether a Traffic Stream (TS) needs to be setup with the AP for the TDLS direct link on this band (either base channel or off channel) prior to Data frame transmissions (any AC) on the TDLS direct link. The field is set to 1 to indicate that a TS needs to be setup with the AP for the TDLS direct link prior to Data frame transmissions on the link; set to 0 otherwise. |
| 84 | Only Triggered TDLS Allowed in 6 GHz | The Only Triggered TDLS Allowed in 6 GHz subfield indicates whether EDCA transmissions are allowed on the TDLS direct link or all Data frame transmissions in the TDLS direct link need to be preceded by a Trigger frame from the AP. The field is set to 1 to indicate that all Data frame transmissions in the TDLS direct link need to be preceded by a Trigger frame from the AP; set to 0 otherwise. |
| 85-n | Reserved | |

Figure 13:
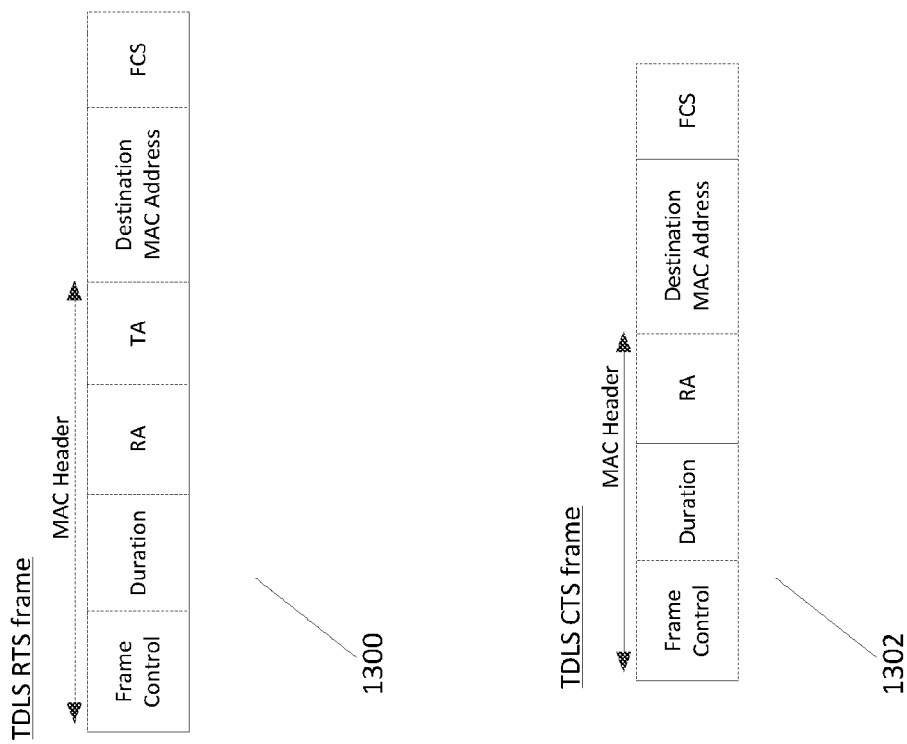
FIG. 13 shows a format of a TDLS RTS (Request to Send) frame and a TDLS CTS (Clear to Send) frame according to a third embodiment.

According to a third embodiment, new RTS (Request to Send) and CTS (Clear to Send) frames may be defined to request and clear TDLS transmissions. FIG. 13 shows a format of a TDLS RTS frame 1300 and a TDLS CTS frame 1302 according to the third embodiment. The TDLS RTS frame 1300 may be transmitted from a TDLS initiator STA to an associated AP to request TXOP for TDLS transmission with another STA (for example, a TDLS responder STA). The TDLS RTS frame 1300 may include (or consist of) a Frame Control field, a Duration field, a RA field, a TA field, a Destination MAC Address field and a FCS field. The RA field may be set to, for example, the MAC address of the TDLS initiator STA, while the Destination MAC Address field may be set to the MAC address of the TDLS responder STA. The presence of the Destination MAC Address field differentiates the TDLS RTS frame from the regular RTS frame.

The TDLS CTS frame 1302 may be transmitted by the AP to the TDLS initiator STA if the AP allows the TDLS STA (STA1 1404 in this example) is responsible for initiating the TDLS TXOP; however, the AP is still able to maintain strict control whether transmissions are allowed on the TDLS direct link.

Figure 14:
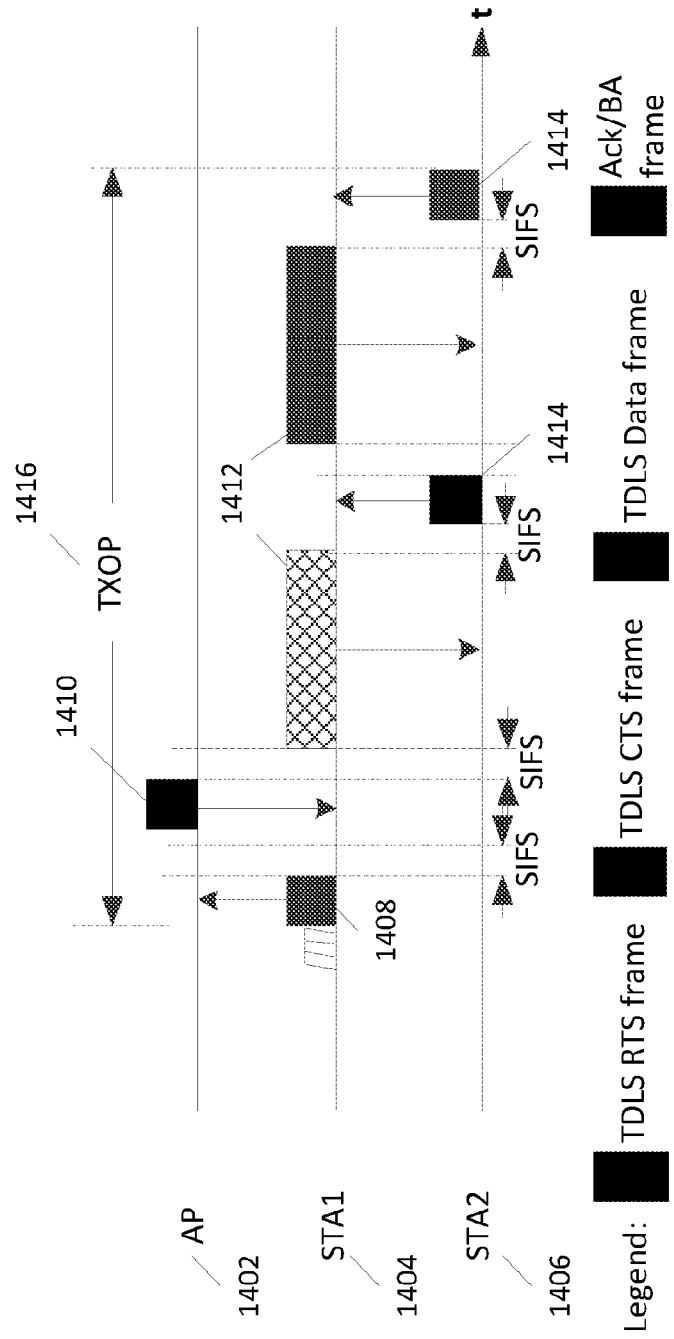
FIG. 14 depicts a message flow illustrating a direct link communication between two STAs over a TXOP according to the third embodiment.

FIG. 14 depicts a message flow illustrating a direct link communication between two STAs over a TXOP according to the third embodiment. STA 1404 may generate and transmit a TDLS RTS frame 1408 to AP 1402 for requesting a TXOP 1416 for TDLS transmission with STA 1406. The TDLS RTS frame 1410 may be in the form of the TDLS RTS frame 1300 as shown in FIG. 13, and may comprise information indicating the STA 1406, such as the MAC address of the STA 1406. The AP 1402 may then generate and transmit a TDLS CTS frame 1410 to the STA 1402 upon receiving the TDLS RTS frame 1408 to allow the transmission. The TDLS CTS frame 1410 may be in the form of the TDLS CTS frame 1302 as shown in FIG. 13, and may comprise information indicating the STA 1406, such as the MAC address of the STA 1406. After receiving the TDLS CTS frame 1410, the STA 1404 may then transmit one or more Data frames 1412 within the request TXOP 1416 to the STA 1406. The STA 1406 may acknowledge each data frame by transmitting an acknowledgement frame 1414 to the STA 1404. In this example, it is assumed that both the STA 1404 and STA 1406 are operating in active mode (i.e. not in power save mode).

Figure 15:
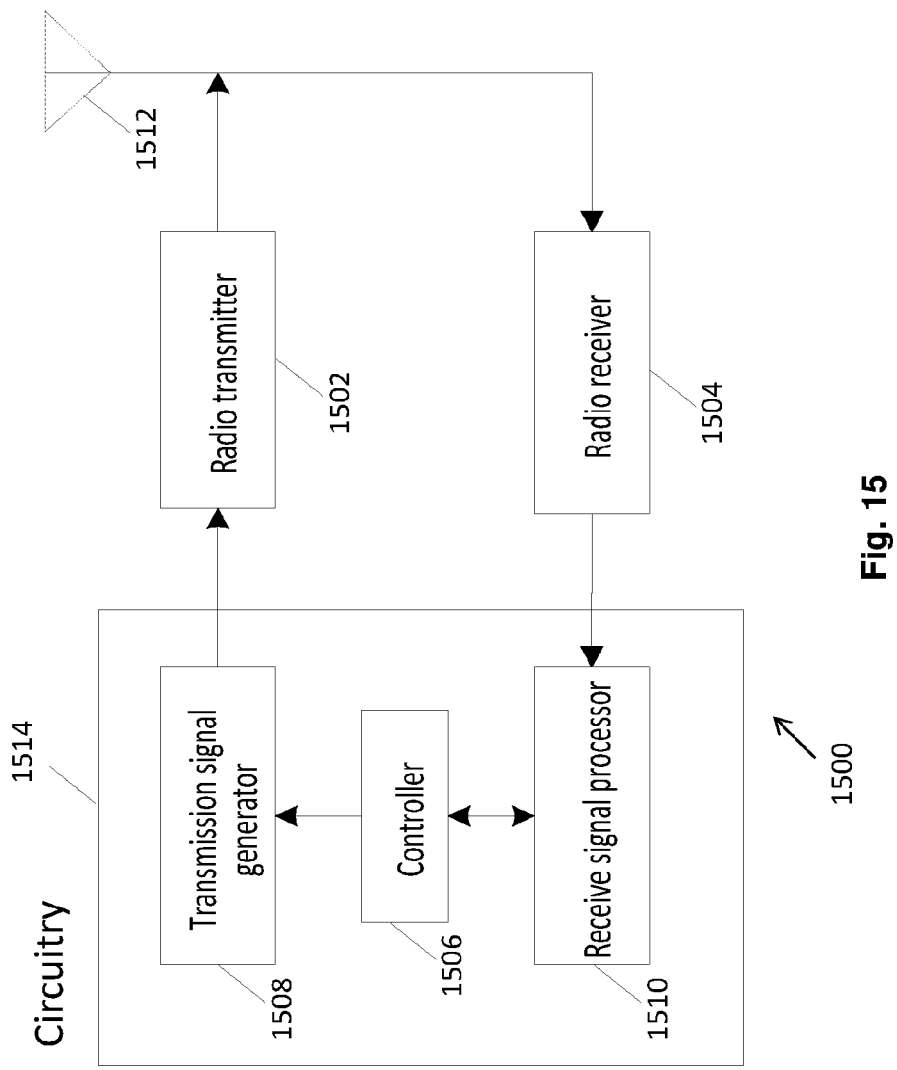
FIG. 15 shows a schematic example of communication apparatus in accordance with various embodiments. The communication apparatus may be implemented as an AP or a STA and configured for enhanced direct link communication in accordance with various embodiments of the present disclosure.

FIG. 15 shows a schematic, partially sectioned view of a communication apparatus 1500 according to various embodiments. The communication apparatus 1500 may be implemented as an AP or a STA according to various embodiments.

As shown in FIG. 15, the communication apparatus 1500 may include circuitry 1514, at least one radio transmitter 1502, at least one radio receiver 1504, and at least one antenna 1512 (for the sake of simplicity, only one antenna is depicted in FIG. 15 for illustration purposes). The circuitry 1514 may include at least one controller 1506 for use in software and hardware aided execution of tasks that the at least one controller 1506 is designed to perform, including control of communications with one or more other communication apparatuses in a wireless network. The circuitry 1514 may furthermore include at least one transmission signal generator 1508 and at least one receive signal processor 1510. The at least one controller 1506 may control the at least one transmission signal generator 1508 for generating frames (for example, TDLS Setup Request frames, TDLS Setup Response frames, TDLS Channel Use Permission Request frames, ADDTS request frames and TDLS RTS frames if the communication apparatus 300 is a STA, and for example TDLS Channel Use Permission Response frames, ADDTS response frames, EDCA Parameter Set element frames, cease operation instruction frames, TDLS Trigger frames, TDLS Buffer Status Report frames and TDLS CTS frames if the communication apparatus 300 is an AP) to be sent through the at least one radio transmitter 1502 to one or more other communication apparatuses and the at least one receive signal processor 1510 for processing frames (for example TDLS Channel Use Permission Response frames, ADDTS response frames, EDCA Parameter Set element frames, cease operation instruction frames, TDLS Trigger frames, TDLS Buffer Status Report frames and TDLS CTS frames if the communication apparatus 300 is a STA, and for example TDLS Setup Request frames, TDLS Setup Response frames, TDLS Channel Use Permission Request frames, ADDTS request frames and TDLS RTS frames if the communication apparatus 300 is an AP) received through the at least one radio receiver 1504 from the one or more other communication apparatuses under the control of the at least one controller 1506. The at least one transmission signal generator 1508 and the at least one receive signal processor 1510 may be stand-alone modules of the communication apparatus 1500 that communicate with the at least one controller 1506 for the above-mentioned functions, as shown in FIG. 15. Alternatively, the at least one transmission signal generator 1508 and the at least one receive signal processor 1510 may be included in the at least one controller 1506. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1502, at least one radio receiver 1504, and at least one antenna 1512 may be controlled by the at least one controller 1506.

The communication apparatus 1500, when in operation, provides functions required for enhanced direct link communication. For example, the communication apparatus 1500 may be a STA configured to communicate wirelessly with an AP on a first channel, and the circuitry 1514 (for example the at least one transmission signal generator 1508 of the circuitry 1514) may, in operation, generate a channel use permission request frame, the channel use permission request frame comprising information indicating the communication apparatus 1500, another communication apparatus and a second channel that is different from the first channel. The radio transmitter 1502 may, in operation, transmit the generated channel use permission request frame to the AP to seek permission from the AP to use the second channel for direct link communication with the another communication apparatus. The radio receiver 1504 may, in operation, receive a channel use permission response frame from the AP permitting use of the second channel, wherein the communication apparatus 1500 is further configured to communicate with the another communication apparatus on a direct link in the second channel after receiving the channel use permission response frame.

The direct link may be a TDLS direct link. The channel use permission response frame may comprise information indicative of a maximum transmission power level and a validity period for the use of the second channel, wherein communication between the communication apparatus and the another communication apparatus on the direct link is stopped upon expiry of the validity period.

Further, the radio receiver 1504 may be further configured to receive a cease operation instruction from the AP, wherein the communication apparatus 1500 is further configured to stop communicating on the direct link after receiving the cease operation instruction.

Further, the circuitry 1514 (for example the at least one transmission signal generator 1508 of the circuitry 1514) may be further configured to generate an ADDTS request frame, the ADDTS request frame comprising information identifying the direct link; wherein the radio transmitter 1502 may be further configured to transmit the generated ADDTS request frame to the AP to request for the AP to setup a traffic stream for the direct link; wherein the radio receiver 1504 may be further configured to to receive a ADDTS response frame from the AP confirming that the traffic stream is setup; and wherein the radio transmitter 1502 may be further configured to transmit data frames belonging to the traffic stream to the another communication apparatus.

For example, the communication apparatus 1500 may be a STA, and the radio receiver 1504 may, in operation, receive a trigger frame from an AP; and wherein the radio transmitter 1502 may, in operation, transmit, on a direct link, one or more data frames to another communication apparatus after receiving the trigger frame. The trigger frame may be, for example, a TDLS Trigger frame. The trigger frame may comprise information indicative of a MAC Address of the another communication apparatus, an Allowed Access Category (AC) and a maximum transmission power level, wherein the one or more data frames are transmitted to the MAC Address and are from a traffic identifier (TID) specified in the Allowed AC or a higher AC, and wherein the one or more data frames are transmitted with a transmission power that is lesser than the maximum transmission power level. Further, the radio transmitter 1502 may be further configured to periodically transmit a buffer status report frame to the AP to report a size of a buffered data corresponding to a TID and addressed to the another communication apparatus, the buffer status report frame further comprising information indicating the direct link.

For example, the communication apparatus 1500 may be a STA configured to communicate wirelessly with an AP, and the circuitry 1514 (for example the at least one transmission signal generator 1508 of the circuitry 1514) may, in operation, generate a TDLS RTS frame, the TDLS RTS frame comprising information indicating another communication apparatus. The radio transmitter 1502 may, in operation, transmit the generated TDLS RTS frame to the AP to request a transmission opportunity (TXOP) for TDLS transmission with the another communication apparatus. The radio receiver 1504 may, in operation, receive a TDLS CTS frame from the AP, wherein the radio transmitter 1502 is further configured to transmit, within the requested TXOP, one or more data frames on a TDLS direct link to the another communication apparatus after receiving the TDLS CTS frame.

For example, the communication apparatus 1500 may be an AP configured to communicate wirelessly with a communication apparatus on a first channel, and the radio receiver 1504 may, in operation, receive a channel use permission request frame from the communication apparatus, the channel use permission request frame requesting use of a second channel that is different from the first channel for direct link communication with another communication apparatus. The circuitry 1514 may, in operation, determine from a frequency coordination database whether the second channel may be used by the communication apparatus and another communication apparatus after receiving the channel use permission request frame. The circuitry 1514 (for example the at least one transmission signal generator 1508 of the circuitry 1514) may be further configured to generate a channel use permission response frame, the channel use permission request frame comprising information indicative of the determination. The radio transmitter 1502 may, in operation, transmit the channel use permission response frame to the communication apparatus, wherein the communication apparatus is configured to communicate on the direct link in the second channel with another communication apparatus based on the determination.

The frequency coordination database may be, for example, an AFC Database. The channel use permission response frame may further comprise information indicative of a maximum transmission power level and a validity period for the use of the second channel, wherein communication between the communication apparatus and another communication apparatus on the direct link is stopped upon expiry of the validity period.

Further, the circuitry 1514 (for example the at least one transmission signal generator 1508 of the circuitry 1514) may be further configured to generate a cease operation instruction frame. The radio transmitter 1502 may be further configured to transmit the generated cease operation instruction to the communication apparatus, instructing it to stop communicating on the direct link.

Further, the circuitry 1514 (for example the at least one transmission signal generator 1508 of the circuitry 1514) may be further configured to generate a trigger frame, the trigger frame comprising information identifying the another communication apparatus, wherein the radio transmitter 1502 may be further configured to transmit the generated trigger frame to the communication apparatus; and wherein the communication apparatus is configured to transmit, on the direct link, one or more data frames to the another communication apparatus after receiving the trigger frame. The trigger frame may, for example, be a TDLS Trigger frame.

For example, the communication apparatus 1500 may be an AP configured to communicate wirelessly with a communication apparatus, and the radio receiver 1504 may, in operation, receive a TDLS RTS frame from the communication apparatus, the TDLS RTS frame requesting the AP for a TXOP for TDLS transmission with another communication apparatus, the TDLS RTS frame comprising information indicating the another communication apparatus. The circuitry 1514 (for example the at least one transmission signal generator 1508 of the circuitry 1514) may, in operation, generate a TDLS CTS frame. The radio transmitter 1502 may, in operation, transmits the TDLS CTS frame to the communication apparatus, wherein the communication apparatus is configured to transmit, within the requested TXOP, one or more data frames on a TDLS direct link to the another communication apparatus after receiving the TDLS CTS frame.

Figure 16:
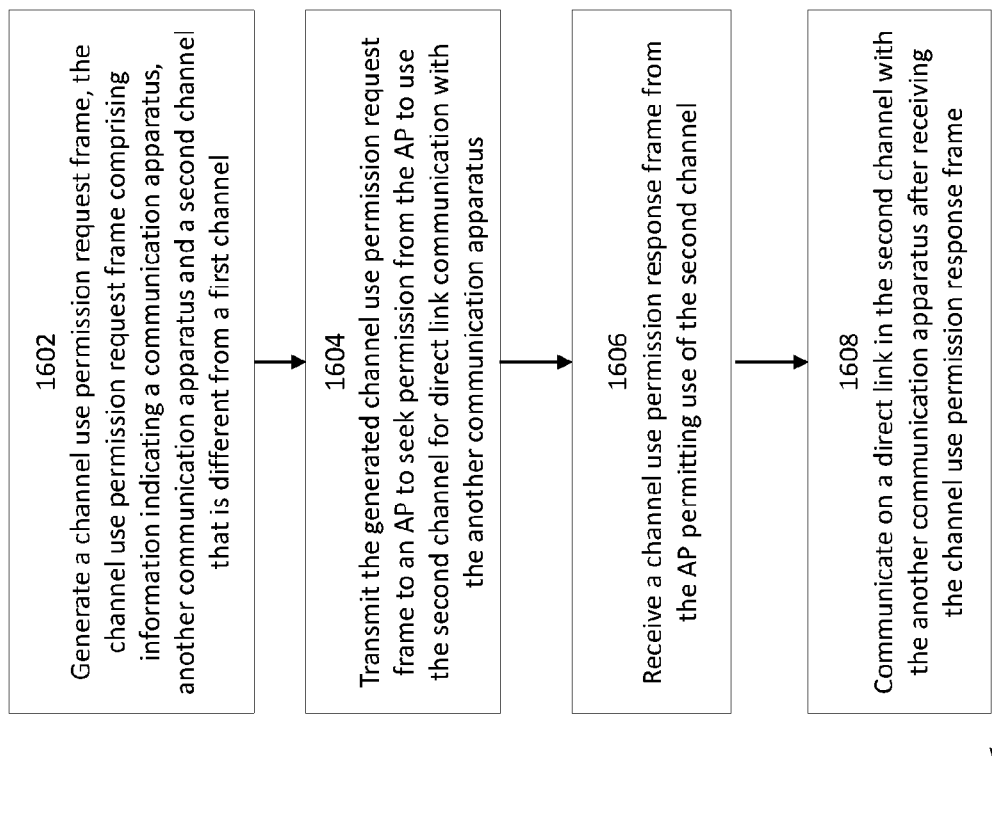
FIG. 16 shows a flow diagram illustrating a communication method according to various embodiments.

FIG. 16 shows a flow diagram 1600 illustrating a communication method according to various embodiments. In step 1602, a channel use permission request frame may be generated, the channel use permission request frame comprising information indicating a communication apparatus, another communication apparatus and a second channel that is different from a first channel. In step 1604, the generated channel use permission request frame may be transmitted to an AP to seek permission from the AP to use the second channel for direct link communication with the another communication apparatus. In step 1606, a channel use permission response frame may be received from the AP permitting use of the second channel. In step 1608, communication may proceed on a direct link in the second channel with the another communication apparatus after receiving the channel use permission response frame.

Figure 17:
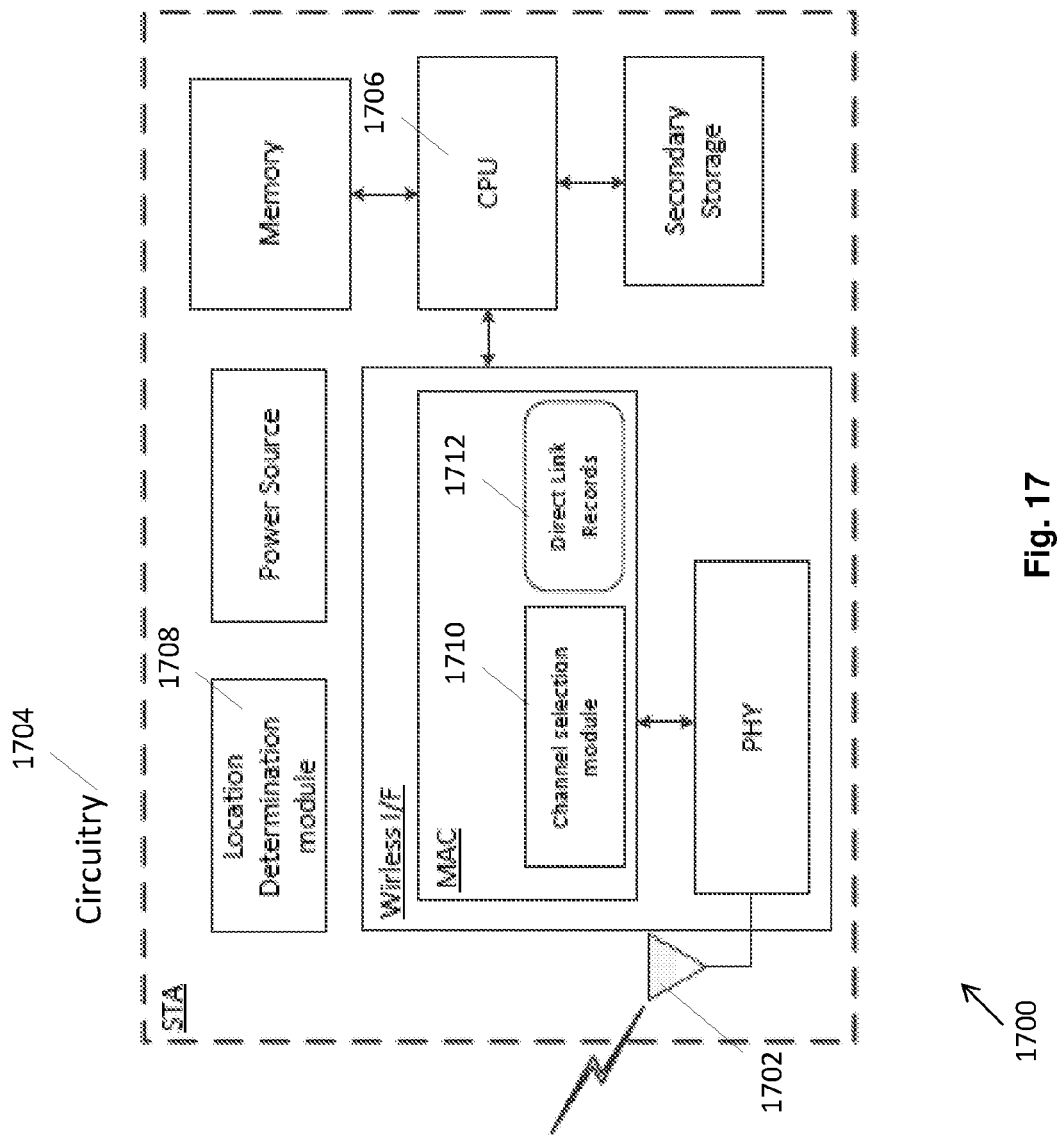
FIG. 17 shows a configuration of a communication device, for example a communication apparatus or a station (STA) according to various embodiments.

FIG. 17 shows a configuration of a communication device 1700, for example a communication apparatus, for example a STA, according to various embodiments. Similar to the schematic example of the communication apparatus as shown in FIG. 15, the communication apparatus 1700 in the schematic example of FIG. 17 includes at least one antenna 1702 with at least one radio transmitter and at least one radio receiver (for the sake of simplicity, the radio transmitter and receiver are not depicted in FIG. 17) and circuitry 1704. The circuitry 1704 may include at least one controller or CPU 1706 for use in software and hardware aided execution of tasks the CPU 1706 is designed to perform, including control of communication with other communication apparatuses such as another STA or an AP.

The circuitry 1702 may further include a location determination module 1708 which is responsible for determining the location of the communication device 1700 which may include the Latitude, Longitude information of its geo-location position. In some regulatory domains, the location information may be used by the AFC system to decide the frequency channels that may be used by the STAs for direct link communications. The circuitry 1702 may further include a channel selection module 1710 which is responsible for selecting the channels to be used for the direct links with other STAs, keeping track of the channel use validity periods on each channel etc. The module may also be responsible for handling the Channel Use Permission Responses from associated AP with regards to the use of the channels for direct links. The circuitry 1702 may further include a Direct Link Records module 1712 that maintain relevant information about the direct links and corresponding traffic, for example the channels allocated for direct links and their validity periods, the traffic stream parameters assigned for the direct link, the buffer status of the various direct links, and other similar data.

Figure 18:
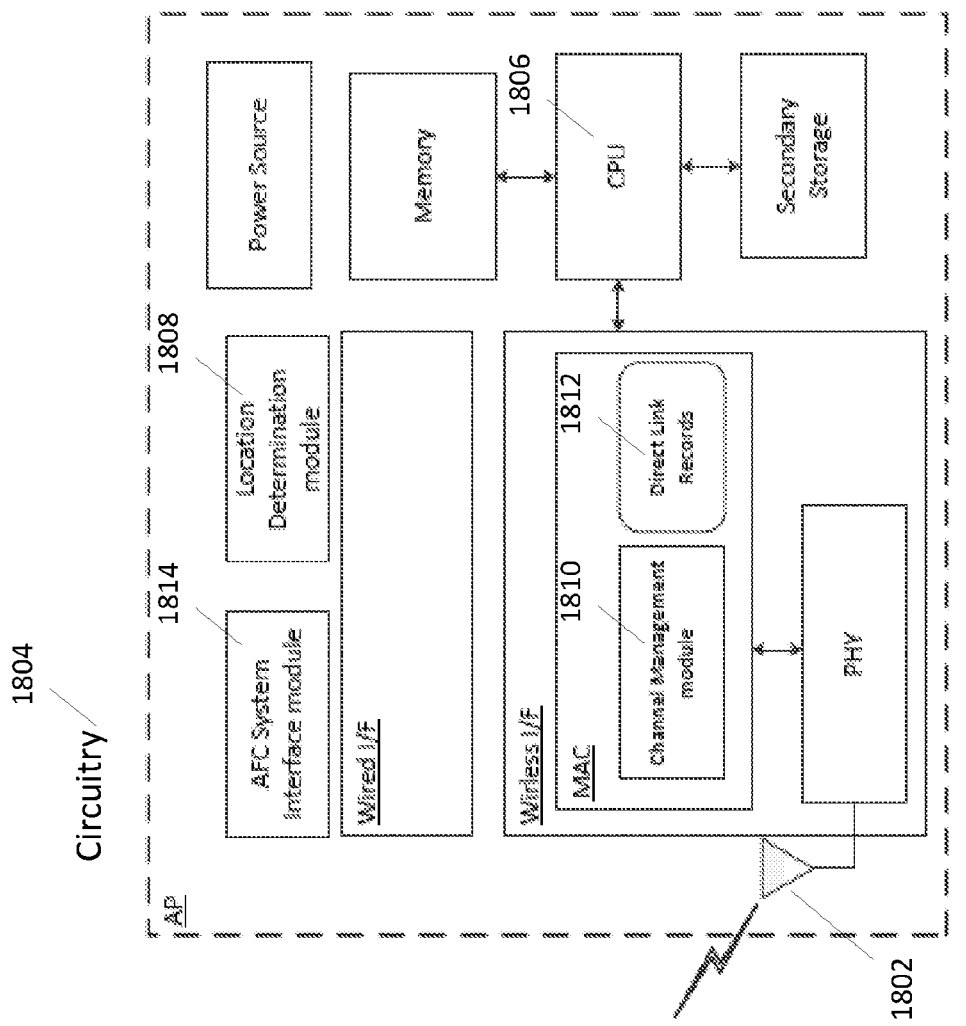
FIG. 18 shows a configuration of a communication device, for example an AP, according to various embodiments.

FIG. 18 shows a configuration of a communication device 1800, for example an AP, according to various embodiments. Similar to the schematic example of the communication apparatus as shown in FIG. 15, the communication apparatus 1800 in the schematic example of FIG. 18 includes at least one antenna 1802 with at least one radio transmitter and at least one radio receiver (for the sake of simplicity, the radio transmitter and receiver are not depicted in FIG. 18) and circuitry 1804. The circuitry 1804 may include at least one controller or CPU 1806 for use in software and hardware aided execution of tasks the CPU 1806 is designed to perform, including control of communication with other communication apparatuses such as a STA or another AP.

The circuitry 1802 may further include an AFC System Interface module 1814 that maintains the information necessary to communicate with the AFC system and acts as the gateway to the AFC system and the AFC database. The actual communication with the AFC system may go through the wired interface. The circuitry 1802 may further include a location determination module 1808 which is responsible for determining the location of the AP device which may include the Latitude, Longitude information of the AP's geo-location position as well as the AP's attitude from the ground. The location information may be used by the AFC system to decide the frequency channels that may be used by the AP and the STAs associated with the AP. The circuitry 1702 may further include a channel management module 1810 for managing the channels that are in use by the STAs associated with the AP and may include transmission of enabling signals on the channels, keeping track of the channel use validity periods etc. The module may also be responsible for handling the Channel Use Permission Requests from associated STAs and liaising with the AFC System Interface module with regards to the use of the channels for direct links. The circuitry 1802 may further include a Direct Link Records module 1812 that maintain relevant information about the direct links and corresponding traffic, for example the channels allocated for direct links and their validity periods, the traffic stream parameters assigned for the direct link, the buffer status of the various direct links, and other similar data.

Figure 19:
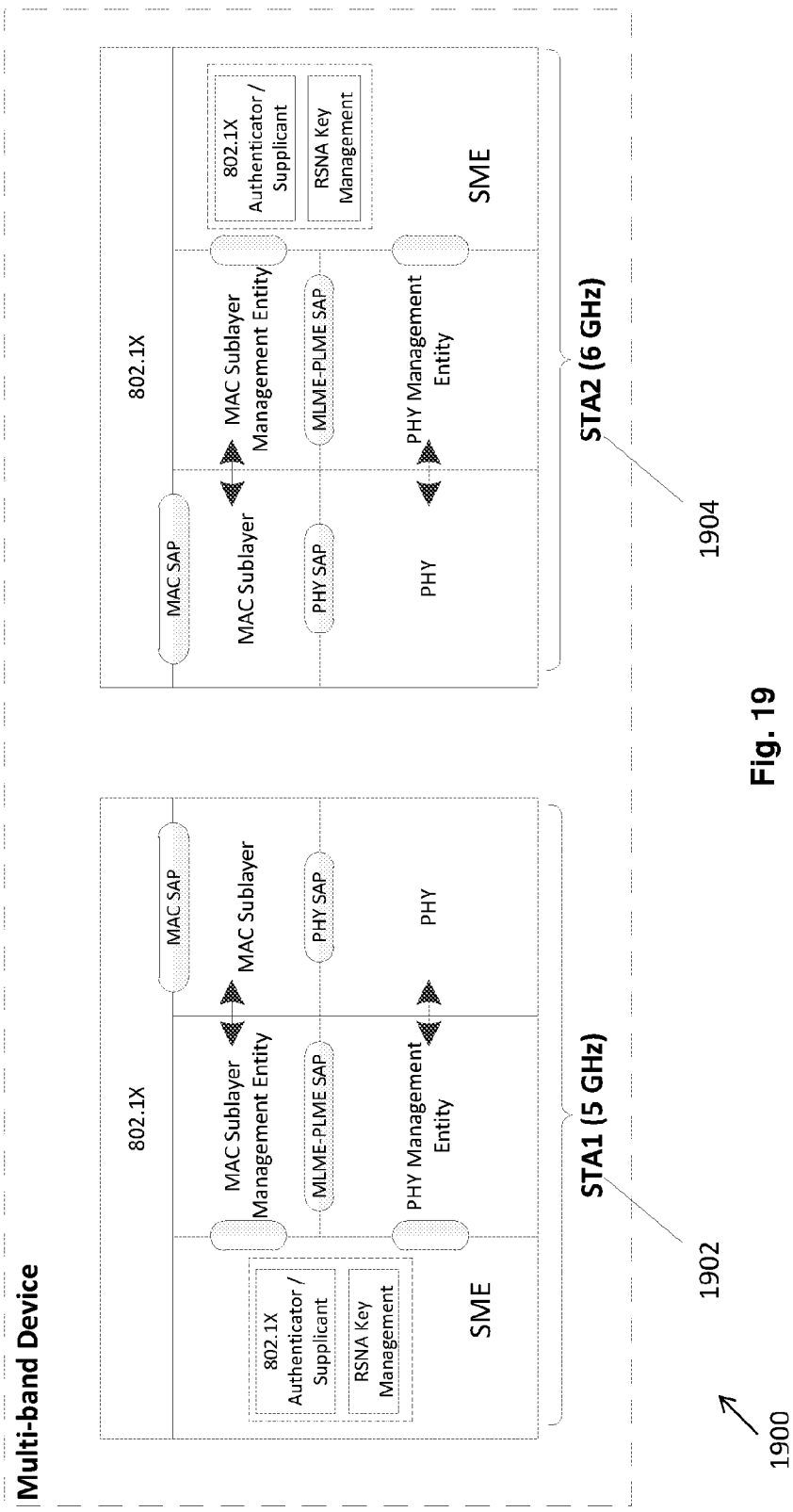
FIG. 19 shows a reference architecture of a multi-band communication device, for example a STA, which may participate in a direct link communication according to various embodiments.

FIG. 19 shows a configuration of a multi-band device, for example a STA, according to various embodiments. A multi-band device may be said to consist of multiple STAs, one for each frequency band. For example, if the multi-band device supports the 5 GHz band and the 6 GHz band, it may be seen to comprise a 5 GHz STA (such as STA 1902) and a 6 GHz STA (such as STA 1904), each STA with its own MAC and PHY layers and associated entities. Each STA may have its own Station Management entity that has access to the MAC and PHY layers of each band through the respective MAC Layer Management Entity (MLME) and PHY Management Entity (PLME). The MAC Service Access Points (SAP) of each STA provides the upper layer protocols with the interface to the band specific MAC and PHY sublayers. In traditional 802.11 networks, even though both the AP and non-AP devices may be multi-band devices, they would appear as distinct STAs on each frequency band and the 5 GHz non-AP STA is required to associate with the 5 GHz AP STA, while the 6 GHz non-AP STA is required to associate with the 6 GHz AP STA. In scenarios where the AP is a single band device (for example an 802.11ac AP) and only operates in the 5 GHz band, the non-AP device may not be able to utilize its 6 GHz STA for communication with the AP. However, two such non-AP devices would be able communicate on the 6 GHz band by setting up a TDLS link between the corresponding 6 GHz STAs. In such cases, the 5 GHz non-AP STA may seek permission from the AP on behalf of the 6 GHz STA for use of the channel in the 6 GHz band for direct link communication with another 6 GHz STA. If the MAC address used by the 6 GHz STA is different from the MAC address used by the 5 GHz STA, the AP may also keep a record of the 6 GHz MAC address to keep track of the direct link.

An EHT AP as well as most EHT non-AP STAs are expected to be multi-band devices that have the capabilities to operate on multiple frequency bands. Traditionally, each frequency band has its own MAC and PHY layers and associated entities and 802.11 treats the entities tied to each frequency band as distinct STAs even if they are housed in the same physical device. Alternatively, regardless of the number of frequency bands on which a multi-band device may operate on, each device may be represented by a single unified MAC Address and the communication links on the various frequencies differentiated by the Band ID and the channel numbers.

As described above, the embodiments of the present disclosure provide an advanced communication system, communication methods and communication apparatuses that enable enhanced direct link communications. Although most of the cited examples in the disclosure refer to IEEE 802.11 networks and devices, the disclosure can also be applied equally well to cellular systems, for example for device-to-device (D2D) communication in LTE-Advanced networks or the upcoming 5G networks. Prior to initiating direct link communication between two cellular User Equipment (UE)s in a channel in the 6 GHz band, a UE may seek permission from its serving Base Station (e.g. an eNodeB) to use the channel for D2D communication with another UE which may be in close proximity to it, by transmitting a channel use permission request to the Base Station. After receiving the channel use permission request from the UE, the Base Station checks the AFC Database (for example via the AFC system) regarding availability of the requested channel. In a successful case, the Base Station may transmit a channel use permission response with a status of SUCCESS to the UE to indicate the requested channel is available for D2D communication. The UE may then proceed to use the channel for D2D communication with another UE.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus configured to communicate wirelessly with an access point (AP) on a first channel, the communication apparatus comprising:
   circuitry, which, in operation, generates a channel use permission request frame, the channel use permission request frame comprising information indicating the communication apparatus, another communication apparatus and a second channel that is different from the first channel;
   a transmitter, which, in operation, transmits the generated channel use permission request frame to the AP to seek permission from the AP to use the second channel for direct link communication with the another communication apparatus; and
   a receiver, which, in operation, receives a channel use permission response frame from the AP permitting use of the second channel, wherein the communication apparatus is further configured to communicate with the another communication apparatus on a direct link in the second channel after receiving the channel use permission response frame,
   wherein the direct link is a Tunneled Direct Link Setup (TDLS),
   wherein the receiver is further configured to receive a trigger frame from the AP, and wherein the transmitter is further configured to transmit, on the direct link, one or more data frames to the another communication apparatus after receiving the trigger frame, and
   wherein the trigger frame comprises information indicative of a MAC Address of the another communication apparatus, an Allowed Access Category (AC) and a maximum transmission power level, wherein the one or more data frames are to be transmitted to the MAC Address and are from a traffic identifier (TID) specified in the Allowed AC or a higher AC, and wherein the one or more data frames are transmitted with a transmission power that is less than the maximum transmission power level.

2. The communication apparatus according to claim 1, wherein the channel use permission response frame comprises information indicative of the maximum transmission power level and a validity period for the use of the second channel, wherein communication between the communication apparatus and the another communication apparatus on the direct link is stopped upon expiry of the validity period.

3. The communication apparatus according to claim 1, wherein the receiver is further configured to receive a cease operation instruction from the AP, wherein the communication apparatus is further configured to stop communicating on the direct link after receiving the cease operation instruction.

4. The communication apparatus according to claim 1, wherein the circuitry is further configured to generate an Add Traffic Stream (ADDTS) request frame, the ADDTS request frame comprising information identifying the direct link;
   wherein the transmitter is further configured to transmit the generated ADDTS request frame to the AP to request for the AP to setup a traffic stream for the direct link;
   wherein the receiver is further configured to receive a ADDTS response frame from the AP confirming that the traffic stream is setup; and
   wherein the transmitter is further configured to transmit data frames belonging to the traffic stream to the another communication apparatus.

5. The communication apparatus of claim 1, wherein the transmitter is further configured to periodically transmit a buffer status report frame to the AP to report a size of a buffered data corresponding to the traffic identifier (TID)

and addressed to the another communication apparatus, the buffer status report frame further comprising information indicating the direct link.

6. A communication method comprising:
  generating a channel use permission request frame, the channel use permission request frame comprising information indicating a communication apparatus, another communication apparatus and a second channel that is different from a first channel;
  transmitting the generated channel use permission request frame to an AP to seek permission from the AP to use the second channel for direct link communication with the another communication apparatus;
  receiving a channel use permission response frame from the AP permitting use of the second channel;
  communicating on a direct link in the second channel with the another communication apparatus on the second channel after receiving the channel use permission response frame,
  wherein the direct link is a Tunneled Direct Link Setup (TDLS);
  receiving a trigger frame from the AP; and
  transmitting, on the direct link, one or more data frames to the another communication apparatus after receiving the trigger frame,
  wherein the trigger frame comprises information indicative of a MAC Address of the another communication apparatus, an Allowed Access Category (AC) and a maximum transmission power level, wherein the one or more data frames are to be transmitted to the MAC Address and are from a traffic identifier (TID) specified in the Allowed AC or a higher AC, and wherein the one or more data frames are transmitted with a transmission power that is less than the maximum transmission power level.

* * * * *